(12) United States Patent
Sato et al.

(10) Patent No.: US 6,226,172 B1
(45) Date of Patent: May 1, 2001

(54) DIELECTRIC CERAMIC COMPOSITION AND ELECTRONIC DEVICE

(75) Inventors: Shigeki Sato; Takeshi Nomura; Akira Sato, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/361,311

(22) Filed: Jul. 27, 1999

(30) Foreign Application Priority Data

Jul. 29, 1998 (JP) .................................................. 10-228669
Jul. 21, 1999 (JP) .................................................. 11-206291

(51) Int. Cl.$^7$ ........................................................ H01G 4/12
(52) U.S. Cl. ........................................ 361/311; 361/321.5
(58) Field of Search ............ 361/311–313, 321.1–321.5, 361/322; 501/134–139

(56) References Cited

FOREIGN PATENT DOCUMENTS

| | | |
|---|---|---|
| 4-292458 | 10/1992 | (JP) . |
| 4-292459 | 10/1992 | (JP) . |
| 4-295048 | 10/1992 | (JP) . |
| 5-109319 | 4/1993 | (JP) . |
| 6-243721 | 9/1994 | (JP) . |
| 8-31232 | 2/1996 | (JP) . |
| 9-40465 | 2/1997 | (JP) . |
| 10-25157 | 1/1998 | (JP) . |

*Primary Examiner*—Anthony Dinkins
(74) *Attorney, Agent, or Firm*—Oliff & Berridge, PLC

(57) ABSTRACT

A dielectric ceramic composition having at least a main component of $BaTiO_3$, a first subcomponent including at least one compound selected from MgO, CaO, BaO, SrO and $Cr_2O_3$, a second subcomponent of $(Ba, Ca)_xSiO_{2+x}$ (where, x=0.8 to 1.2), a third subcomponent including at least one compound selected from $V_2O_5$, $MoO_3$, and $WO_3$, and a fourth subcomponent including an oxide of R1 (where R1 is at least one element selected from Sc, Er, Tm, Yb, and Lu), wherein the ratios of the subcomponents to 100 moles of the main component of $BaTiO_3$ are as follows: first subcomponent: 0.1 to 3 moles, second subcomponent: 2 to 10 moles, third subcomponent: 0.01 to 0.5 mole, and fourth subcomponent: 0.5 to 7 moles (where the number of moles of the fourth subcomponent is the ratio of R1 alone). The dielectric ceramic composition has a high relative dielectric constant, has a capacity-temperature characteristic satisfying the X8R characteristic of the EIA standard (−55 to 150° C., ΔC =±15% or less), enables sintering in a reducing atmosphere, has a small change in the capacity under a direct current electric field along with time, and further has a long lifetime of the insulation resistance.

14 Claims, 7 Drawing Sheets

DIELECTRIC CERAMIC COMPOSITION AND ELECTRONIC DEVICE

BACKGROUND OF THE INVENTION

1. Field of the Invention

The present invention relates to a dielectric ceramic composition having a resistance to reduction and to a multi-layer ceramic capacitor or other electronic device using the same.

2. Description of the Related Art

A multi-layer ceramic capacitor, one type of electronic device, is being broadly used as a compact, large capacity, high reliability electronic device. The number used in each piece of electronic equipment has also become larger. In recent years, along with the increasing miniaturization and improved performance of equipment, there have been increasingly stronger demands for further reductions in size, increases in capacity, reductions in price, and improvements in reliability in multi-layer ceramic capacitors.

Multi-layer ceramic capacitors are normally produced by stacking a paste for formation of the internal electrode layers and a paste for formation of the dielectric layers using the sheet method or printing method etc. and then cofiring the internal electrode layers and dielectric layers in the stack.

As the electroconductive material for the internal electrode layers, generally Pd or a Pd alloy is being used, but Pd is high in price and therefore relatively inexpensive Ni, Ni alloys, and other base metals have been coming into use. When using a base metal as the electroconductive material of the internal electrode layers, sintering in the atmosphere ends up causing the internal electrode layers to oxidize and therefore the cofiring of the dielectric layers and internal electrode layers has to be done in a reducing atmosphere. If cofiring in a reducing atmosphere, however, the dielectric layers end up being reduced and becoming lower in specific resistance. Therefore, nonreducing type dielectric materials are being developed.

Multi-layer ceramic capacitors using nonreducing dielectric materials, however, suffer from a remarkable deterioration in the IR (insulation resistance) due to application of an electric field, that is, there are the problems that the IR lifetime is short and the reliability is low.

Further, if a dielectric is exposed to a direct current electric field, the problem arises of the specific dielectric constant $\epsilon_r$ falling along with time. If the dielectric layers are made thinner so as to reduce the size of the chip capacitor and increase its capacity, the electric field acting on the dielectric layers will become stronger when the direct current voltage is applied, so the change in the specific dielectric constant $\epsilon_r$ along with time, that is, the change in the capacity along with time, will end up becoming much larger.

Further, a capacitor is also required to be excellent in temperature characteristic. In particular, in some applications, it is desired that the temperature characteristic be smooth under harsh conditions. In recent years, multi-layer ceramic capacitors have come into use for various types of electronic equipment such as the engine electronic control units (ECU) mounted in the engine compartments of automobiles, crank angle sensors, antilock brake system (ABS) modules, etc. These electronic equipment are used for stabilizing engine control, drive control, and brake control, and therefore are required to have excellent circuit temperature stability.

The environment in which these electronic equipment are used is envisioned to be one in which the temperature falls to as low as −20° C. or so in the winter in cold areas or the temperature rises to as high as +130° C. or so in the summer right after engine startup. Recently, there has been a trend toward reduction of the number of wire harnesses used for connecting electronic apparatuses and the equipment they control. Electronic apparatuses are also being mounted outside of the vehicles in some cases. Therefore, the environment is becoming increasingly severe for electronic apparatuses. Accordingly, the capacitors used for these electronic apparatuses have to have smooth temperature characteristics in a broad temperature range.

As tempetature-compensating capacitor materials superior in temperature characteristics, (Sr, Ca)(Ti, Zr)$O_3$ based, Ca(Ti, Zr)$O_3$ based, $Nd_2O_3$—$2TiO_2$ based, $La_2O_3$—$2TiO_2$ based, and other materials are generally known, but these compositions have extremely low specific dielectric constants (generally less than 100), so it is substantially impossible to produce a capacitor having a large capacity.

As a dielectric ceramic composition having a high dielectric constant and a smooth capacity-temperature characteristic, a composition comprised of $BaTiO_3$ as a main component plus $Nb_2O_5$—$Co_3O_4$, MgO—Y, rare earth elements (Dy, Ho, etc.), $Bi_2O_3$—$TiO_2$, etc. is known. Looking at the temperature characteristic of a dielectric ceramic composition comprising $BaTiO_3$ as a main component, since the Curie temperature of pure $BaTiO_3$ is close to about 130° C., it is extremely difficult to satisfy the R characteristic of the capacity-temperature characteristic ($\Delta C=\pm 15\%$ or less) in the region higher in temperature than that. Therefore, a $BaTiO_3$ based high dielectric constant material can only satisfy the X7R characteristic of the EIA standard (−55 to 125° C., $\Delta C=\pm 15\%$ or less). If only satisfying the X7R characteristic, the material is not good enough for an electronic apparatus of an automobile which is used in the above-mentioned harsh environments. An electronic apparatus requires a dielectric ceramic composition satisfying the X8R characteristic of the EIA standard (−55 to 150° C., $\Delta C=\pm 15\%$ or less).

To satisfy the X8R characteristic in a dielectric ceramic composition comprised of $BaTiO_3$ as a main component, it has been proposed to shift the Curie temperature to the high temperature side by replacing the Ba in the $BaTiO_3$ with Bi, Pb, etc. (Japanese Unexamined Patent Publication (Kokai) Nos. 10-25157 and 9-40465). Further, it has also been proposed to satisfy the X8R characteristic by selecting a $BaTiO_3+CaZrO_3+ZnO+Nb_2O_5$ based composition (Japanese Unexamined Patent Publication (Kokai) No. 4-295048, No. 4-292458, No. 4-292459, No. 5-109319, and No. 6-243721). In each of these compositions as well, however, since the easily vaporized and diffusing Pb, Bi, and Zn are used, sintering in air or another oxidizing atmosphere becomes a prerequisite. Therefore, there are the problems that it is not possible to use an inexpensive base metal such as Ni for the internal electrodes of the capacitor and it is necessary to use Pd, Au, Ag, or another high priced precious metal.

SUMMARY OF THE INVENTION

The object of the present invention is to provide a dielectric ceramic composition having a high specific dielectric constant, having a capacity-temperature characteristic satisfying the X8R characteristic of the EIA standard (−55 to 150° C., $\Delta C=\pm 15\%$ or less), enabling sintering in a reducing atmosphere, having a small change in the capacity under a direct current electric field along with time, and further having a long lifetime of the insulation resistance and, further, to provide a multi-layer ceramic capacitor or other electronic device using this dielectric ceramic composition.

To achieve the above object, the dielectric ceramic composition according to the first aspect of the present invention is a dielectric ceramic composition comprising at least:

a main component of $BaTiO_3$, a first subcomponent including at least one compound selected from MgO, CaO, BaO, SrO and $Cr_2O_3$, a second subcomponent of $(Ba, Ca)_x SiO_{2+x}$ (where, x=0.8 to 1.2), a third subcomponent including at least one compound selected from $V_2O_5$, $MoO_3$, and $WO_3$, and a fourth subcomponent including an oxide of R1 (where R1 is at least one element selected from Sc, Er, Tm, Yb, and Lu), wherein the ratios of the subcomponents to 100 moles of the main component of $BaTiO_3$ are:

first subcomponent: 0.1 to 3 moles,.

second subcomponent: 2 to 10 moles, third subcomponent: 0.01 to 0.5 mole, and fourth subcomponent: 0.5 to 7 moles (where the number of moles of the fourth subcomponent is the ratio of R1 alone).

Note that the ratios of Ba and Ca in the second subcomponent can be any ratios and a subcomponent containing just one of Ba and Ca is also possible. Preferably, the dielectric ceramic composition according to the present invention further comprises as a fifth subcomponent an oxide of R2 (where R2 is at least one element selected from Y, Dy, Ho, Th, Gd and Eu), where the content of the fifth subcomponent being not more than 9 moles with respect to 100 moles of the main component of $BaTiO_3$ (where the number of moles of the fifth subcomponent is the ratio of R2 alone).

Further, preferably, the total content of the fourth subcomponent and the fifth subcomponent is not more than 13 moles with respect to 100 moles of the main component of $BaTiO_3$ (where the numbers of moles of the fourth subcomponent and fifth subcomponent are the ratios of R1 and R2 alone), more preferably not more than 10 moles.

Further, preferably, the dielectric ceramic composition according to the present invention further comprises as a sixth subcomponent MnO, the content of the sixth subcomponent being not more than 0.5 mole with respect to 100 moles of the main component of $BaTiO_3$.

The dielectric ceramic composition according to a second aspect of the present invention is a dielectric ceramic composition containing $BaTiO_3$ as a main component, wherein X-ray diffraction using Cu-Kα-rays reveals a pseudo cubic peak including a (002) peak and (200) peak in the range of 2θ=44 to 46°, the half-width of the pseudo cubic peak is at least 0.3°, and, when the intensity of the (002) peak is I(002) and the intensity of the (200) peak is I(200), I(002) ≧I(200).

The dielectric ceramic composition according to a third aspect of the present invention is a dielectric ceramic composition containing $BaTiO_3$ as a main component, wherein when the value of the heat flow difference per unit time (dq/dt) measured by DSC (differential scan calorimetry) differentiated by temperature is DDSC, the temperature difference between the pair of peaks present at the two sides of the Curie temperature in a graph of the relationship between temperature and the DDSC is at least 4.1° C.

If the peak in the graph showing the relationship between the temperature and ethe DDSC is not clear enough, the dielectric ceramic composition wherein the half-width in the graph showing the relationship between the temperature and the DSC is at least 4.1° C. corresponds to the dielectric ceramic composition according to the third aspect of the present invention. The half-width is defined to be a temperature difference between the two points sandwiching the peak, wherein a line linking the two points and extending in parallel to a base line of the endothermic peak in the graph showing the relationship between the temperature and the DSC has the half width of the base line.

An electronic device according to the present invention is not particularly limited so long as it is an electronic device having a dielectric layer. For example, it is a multi-layer ceramic capacitor device having a capacitor device body comprised of the dielectric layers and internal electrode layers alternately stacked. In the present invention, the dielectric layer is comprised of any of the above dielectric compositions. The electroconductive material included in the internal electrode layer is not particularly limited, but for example is Ni or an Ni alloy.

BRIEF DESCRIPTION OF THE DRAWINGS

The present invention will be explained below based on embodiments shown in the drawings, in which.

DESCRIPTION OF THE PREFERRED EMBODIMENTS

Multi-layer Ceramic Capacitor

Figure 1:
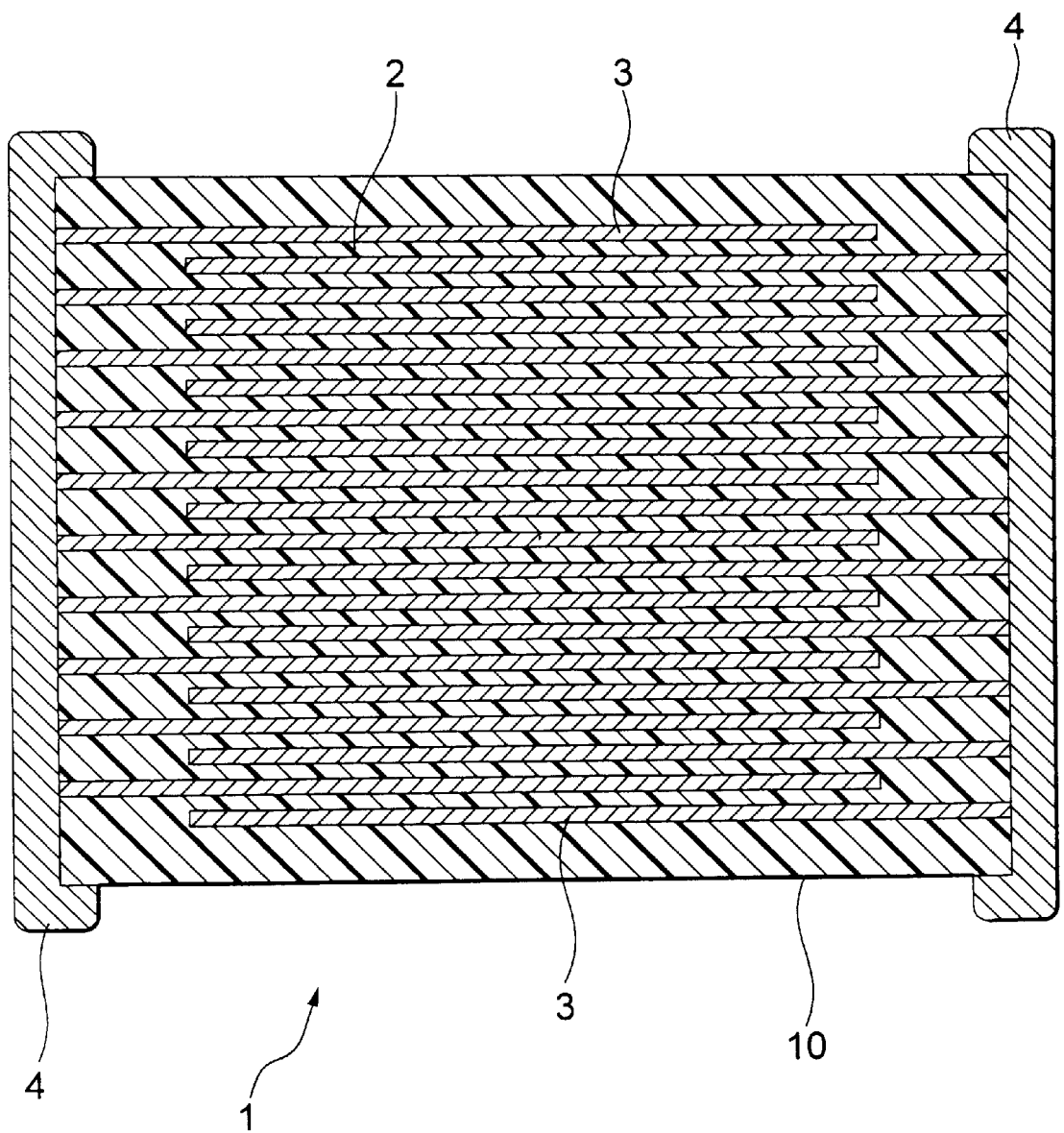
FIG. 1 is a sectional view of a multi-layer ceramic capacitor according to one embodiment of the present invention.

As shown in FIG. 1, the multi-layer ceramic capacitor according to one embodiment of the present invention has a capacitor device body 10 of a configuration of dielectric layers 2 and internal electrode layers 3 stacked alternately. At the two ends of the capacitor device body 10 are formed a pair of external electrodes 4 conductive with the internal electrode layers 3 alternately arranged inside the device body 10. The shape of the capacitor device body 10 is not particularly limited, but normally is made a parallelepiped. Further, the dimensions are not particularly limited and may be made suitable dimensions in accordance with the application. Usually, however, they are (0.6 to 5.6 mm) ×(0.3 to 5.0 mm) ×(0.3 to 1.9 mm).

The internal electrode layers 3 are stacked so that end faces thereof alternately protrude out to the surfaces of the two opposing ends of the capacitor device body 10. The pair of external electrodes 4 are formed at the two ends of the capacitor device body 10 and are connected to the exposed end faces of the alternately arranged internal electrode layers 3.

Dielectric Layers 2

Each of the dielectric layers 2 contains the dielectric ceramic composition of the present invention.

The dielectric ceramic composition of the present invention is comprised of a dielectric ceramic composition comprising at least:

a main component of $BaTiO_3$, a first subcomponent including at least one compound selected from MgO, CaO, BaO, SrO and $Cr_2O_3$, a second subcomponent of $(Ba, Ca)_x SiO_{2+x}$ (where, x=0.8 to 1.2), a third subcomponent including at least one compound selected from $V_2O_5$, $MoO_3$, and $WO_3$, and a fourth subcomponent including an oxide of R1 (where R1 is at least one element selected from Sc, Er, Tm, Yb, and Lu).

The ratios of the subcomponents to the main component of $BaTiO_3$ are, with respect to 100 moles of the $BaTiO_3$:

first subcomponent: 0.1 to 3 moles, second subcomponent: 2 to 10 moles, third subcomponent: 0.01 to 0.5 mole, and fourth subcomponent: 0.5 to 7 moles, preferably first subcomponent: 0.5 to 2.5 moles, second subcomponent: 2.0 to 5.0 moles, third subcomponent: 0.1 to 0.4 mole, and fourth subcomponent: 0.5 to 5.0 moles, Note that the ratio of the fourth subcomponent is not the molar ratio of the R1 oxide, but the molar ratio of R1 alone. That is, when for example using an oxide of Yb as the fourth subcomponent, a ratio of the fourth subcomponent of 1 mole does not mean the ratio of the $Yb_2O_3$ is 1 mole, but the ratio of Yb is 1 mole.

In this specification, the oxides constituting the main component and the subcomponents are expressed by stoichiochemical compositions, but the oxidized state of the oxides may also deviate from the stoichiochemical compositions. The ratios of the subcomponents, however, are found by conversion from the amounts of the metals contained in the oxides constituting the subcomponents to the oxides of the above stoichiochemical compositions.

The reasons for limiting the contents of the above subcomponents are as follows.

If the content of the first subcomponent (MgO, CaO, BaO, SrO, and $Cr_2O_3$) is too small, the rate of change of the capacity-temperature characteristic ends up becoming large. On the other hand, if the content is too large, the sinterability deteriorates. Note that the ratios of the oxides in the first subcomponent may be any ratios.

The BaO and the CaO in the second subcomponent [(Ba, Ca)$_x$ SiO$_{2+x}$] are also contained in the first subcomponent, but the composite oxide (Ba, Ca)$_x$SiO$_{2+x}$ has a low melting point, so it has good reactivity with the main component. Therefore, in the present invention, the BaO and/or CaO are also added as the above composite oxide. If the content of the second subcomponent is too small, the capacity-temperature characteristic becomes poor and the IR (insulation resistance) falls. On the other hand, if the content is too great, the IR lifetime becomes insufficient and, further, the dielectric constant ends up falling rapidly. The x in the (Ba, Ca)$_x$SiO$_{2+x}$ is preferably 0.8 to 1.2, more preferably 0.9 to 1.1. If x is too small, that is, if the $SiO_2$ is too great, the main component of $BaTiO_3$ will be reacted with and the dielectric property will end up deteriorating. On the other hand, if x is too large, the melting point will become high and the sinterability will be deteriorated, so this is not preferable. Note that the ratios of Ba and Ca in the second subcomponent are any ratios. A subcomponent containing just one is also possible.

The third subcomponent ($V_2O_5$, $MoO_3$, and $WO_3$) exhibits the effect of smoothing the capacity-temperature characteristic above the Curie temperature and the effect of improving the IR lifetime. If the content of the third subcomponent is too small, these effects become insufficient.

On the other hand, if the content is too great, the IR remarkably falls. Note that the ratios of the oxides in the third subcomponent may be any ratios.

The fourth subcomponent (R1 oxide) exhibits the effect of shifting the Curie temperature to the high temperature side and the effect of smoothing the capacity-temperature characteristic. If the content of the fourth subcomponent is too small, these effects become insufficient and the capacity-temperature characteristic ends up deteriorating. On the other hand, if the content is too large, the sinterability tends to deteriorate. Among the fourth subcomponents, a Yb oxide is preferred since it has a high effect on improvement of the characteristic and further is inexpensive in cost.

The dielectric ceramic composition of the present invention preferably, in accordance with need, contains as a fifth subcomponent an R2 oxide (where, R2 is at least one element selected from Y, Dy, Ho, Tb, Gd and Eu). The fifth subcomponent (R2 oxide) exhibits the effect of improvement of the IR and the IR lifetime and has little adverse effect on the capacity-temperature characteristic. If the content of the R2 oxide is too large, however, the sinterability tends to deteriorate. Among the fifth subcomponents, a Y oxide is preferred since it has a high effect on improvement of the characteristic and further is inexpensive in cost.

The total content of the fourth subcomponent and the fifth subcomponent is preferably not more than 13 moles, more preferably not more than 10 moles, with respect to 100 moles of the main component of $BaTiO_3$ (where the numbers of moles of the fourth subcomponent and the fifth subcomponent are ratios of R1 and R2 alone). This is to keep the sinterability good.

Further, the dielectric ceramic composition of the present invention may contain as a sixth subcomponent MnO. This sixth subcomponent exhibits the effect of promotion of sintering, the effect of an increase of the IR, and an effect of improvement of the IR lifetime. To sufficiently obtain these effects, the ratio of the sixth subcomponent with respect to 100 moles of the $BaTiO_3$ is preferably at least 0.01 mole. If the content of the sixth subcomponent is too large, there is an adverse effect on the capacity-temperature characteristic, so the content is preferably made not more than 0.5 mole.

Further, the dielectric ceramic composition of the present invention may also contain $Al_2O_3$ in addition to the above oxides. $Al_2O_3$ does not have much of an effect on the capacity-temperature characteristic and exhibits the effect of improvement of the sinterability, IR, and IR lifetime. If the content of the $Al_2O_3$ is too large, however, the sinterability deteriorates and the IR falls, so the $Al_2O_3$ is preferably included in an amount of not more than 1 mole with respect to 100 moles of the $BaTiO_3$, more preferably not more than 1 mole of the dielectric ceramic composition as a whole.

Note that when at least one element of Sr, Zr, and Sn replaces the Ba or Ti in the main component constituting the perovskite structure, the Curie temperature shifts to the low temperature side, so the capacity-temperature characteristic above 125° C. deteriorates. Therefore, it is preferable not to use a $BaTiO_3$ containing these elements for example, [(Ba, Sr)$TiO_3$] as a main component. There is however no particular problem with a level contained as an impurity (less than 0.1 mol% of the dielectric ceramic composition as a whole).

The average grain size of the dielectric ceramic composition of the present invention is not particularly limited and may be suitably determined in accordance with the thickness of the dielectric layers etc. from the range of for example 0.1 to 3.0 μm. The capacity-temperature characteristic deteriorates the thinner the dielectric layers are and tends to deteriorate the smaller the average grain is in size. Therefore, the dielectric ceramic composition of the present invention is particular effective when having to make the average grain size small, specifically, when the average grain size is 0.1 to 0.5 $\mu$m. Further, if the average grain size is made small, the IR lifetime becomes longer and further the change in the capacity under a direct current electric field over time becomes smaller, so it is preferable that the average grain size be small as explained above from this viewpoint as well.

The Curie temperature of the dielectric ceramic composition of the present invention (phase transition temperature from strong dielectric to ordinary dielectric) may be changed by selecting the composition, but to satisfy the X8R characteristic, it is, preferably made at least 120° C., more preferably at least 123° C. Note that the Curie temperature may be measured using DSC (differential scan calorimetry).

The thickness of the dielectric layers comprised of the dielectric ceramic composition of the present invention is normally not more than 40$\mu$m, particularly not more than 30$\mu$m, per layer. The lower limit of the thickness is normally about 2$\mu$m. The dielectric ceramic composition of the present invention is effective for the improvement of the capacity-temperature characteristic of a multi-layer ceramic capacitor having such thinned dielectric layers. Note that the number of the dielectric layers stacked is normally 2 to 300 or so.

The multi-layer ceramic capacitor using the dielectric ceramic composition of the present invention is suitable for use as an electronic device for equipment used at over 80° C., in particular in an environment of 125 to 150° C. Further, in this temperature range, the temperature characteristic of the capacity satisfies the R characteristic of the EIA standard and also satisfies the X8R characteristic. It is also possible to simultaneously satisfy the B characteristic of the EIAJ standard [rate of change of capacity of within ±10% at −25 to 85° C. (reference temperature 20° C.)] and the X7R characteristic of the EIA standard (−55 to 125 ° C., $\Delta C$=±15% or less).

In a multi-layer ceramic capacitor, the dielectric layers are normally subjected to an alternating current electric field of from 0.02V/$\mu$m, in particular from 0.2$\mu$m, further from 0.5V/$\mu$m, to generally not more than 5V/$\mu$m and a direct current electric field of not more than 5V/$\mu$m superposed over this, but the temperature characteristic of the capacity is extremely stable even when such electric fields are applied.

The dielectric ceramic composition of the present invention includes a dielectric ceramic composition having $BaTiO_3$ as its main component which satisfies the following condition in X-ray diffraction using Cu-K$\alpha$ rays. The conditions are that a (002) peak and (200) peak be observed overlappingly in the range of 2$\theta$=44 to 46° as a pseudo cubic peak, that the half width of the pseudo cubic peak be at least 0.3°, and, when the intensity of the (002) peak is I(002) and the intensity of the (200) peak is I(200), I(002)≧I(200). By satisfying these conditions, the capacity-temperature characteristic is improved and the X8R characteristic can be satisfied.

Note that the measurement conditions in the X-ray diffraction are not particularly limited, but the following measurement conditions are normally used to obtain a resolution of a degree enabling the half width to be discerned.

Scan width: not more than 0.05°

Scan rate: not more than 0.1° /minute

X-ray detection conditions

Parallel slits: not more than 1°

Dispersion slits: not more than 1°

Light receiving slits: not more than 0.3 mm

The dielectric ceramic composition containing the above first to fourth subcomponents as essential components can satisfy the above conditions in X-ray diffraction, but even other compositions of dielectric ceramic compositions can satisfy the above conditions in X-ray diffraction by suitably controlling the composition and the manufacturing conditions.

Further, the present invention includes a dielectric ceramic composition containing $BaTiO_3$ as a main component which exhibits the following characteristics in DSC (differential scan calorimetry). DSC is a method for measurement finding the relationship between the temperature and the heat flow difference (dq/dt) per unit time and is used for measurement of the Curie temperature etc. The value of the heat flow difference differentiated by the temperature (hereinafter referred to as the DDSC) becomes 0 in the Curie temperature. Graphing the relationship between the temperature and DDSC, there is a plus DDSC peak at the low temperature side of the Curie temperature and a minus DDSC peak at the high temperature side. This dielectric ceramic composition having the characteristic of a distance between these two peaks (temperature difference) of at least 4.1 ° C., preferably at least 6° C., becomes excellent in the temperature characteristic of the capacity and can satisfy the X8R characteristic.

A dielectric ceramic composition containing the above first to fourth subcomponents as essential components can satisfy the above characteristic in DSC, but even other compositions of dielectric ceramic compositions can satisfy the above characteristic in DSC by suitably controlling the composition and the manufacturing conditions.

Internal Electrode Layers 3

The electroconductive material contained in the internal electrode layers 3 is not particularly limited, but a base metal may be used since the material constituting the dielectric layers 2 has a resistance to reduction. As the base metal used as the electroconductive material, Ni or an Ni alloy is preferable. As the Ni alloy, an alloy of at least one type of element selected from Mn, Cr, Co, and Al with Ni is preferable. The content of the Ni in the alloy is preferably not less than 95 wt%.

Note that the Ni or Ni alloy may contain P and other various types of trace components in amounts of not more than 0.1 wt% or so.

The thickness of the internal electrode layer may be suitably determined in accordance with the application etc., but is usually 0.5 to 5 $\mu$m, in particular 0.5 to 2.5 $\mu$m or so is preferable.

External Electrodes 4

The electroconductive material contained in the external electrodes 4 is not particularly limited, but in the present invention an inexpensive Ni, Cu, or alloys of the same may be used.

The thickness of the external electrodes may be suitably determined in accordance with the application etc., but is usually 10 to 50 $\mu$m or so.

Method of Manufacturing Multi-Layer Ceramic Capacitor

The multi-layer ceramic capacitor using the dielectric ceramic composition of the present invention, like the conventional multi-layer ceramic capacitor, is produced by preparing a green chip using the usual printing method or sheet method which uses pastes, sintering the green chip, then printing or transferring and sintering the external electrodes. The method of manufacture will be explained in detail below.

The dielectric layer paste may be an organic-based paint comprised of a mixture of a dielectric ingredient and an organic vehicle and may also be a water-based paint.

For the dielectric ingredient, use may be made of the above-mentioned oxides or mixtures thereor or composite oxides, but it is also possible to suitably select and mix for use various compounds forming the above oxides or composite oxides by sintering, for example, carbonates, oxalates, nitrates, hydroxides, and organic metal compounds. The content quantity of the compounds in the dielectric ingredient may be suitably determined so as to give the above-mentioned composition of the dielectric ceramic composition after sintering.

The dielectric ingredient is normally used as a powder of an average particle size of 0.1 to 3 μm.

The organic vehicle is comprised of a binder dissolved in an organic solvent. The binder used for the organic vehicle is not particularly limited, but may be suitably selected from ethyl cellulose, polyvinyl butyral, and other ordinary types of binders. Further, the organic solvent used is also not particularly limited and may be suitably selected from terpineol, butyl carbitol, acetone, toluene, and other organic solvents in accordance with the printing method, sheet method, or other method of use.

Further, when using a water-based paint as the dielectric layer paste, it is sufficient to knead a water-based vehicle comprised of a water-based binder or dispersant etc. dissolved in water together with the dielectric layer ingredient. The water-based binder used for the water-based vehicle is not particularly limited. For example, a polyvinyl alcohol, cellulose, water-based acrylic resin, etc. may be used.

The internal electrode layer paste is prepared by kneading the electroconductive material comprised of the above various types of dielectric metals and alloys or various types of oxides forming the above electroconductive materials after sintering, an organic metal compound, resinate, etc. together with the above organic vehicle.

The external electrode paste may be prepared in the same way as the above internal electrode layer paste.

The content of the organic vehicle in the above pastes is not particularly limited and may fall within the usual content, for example, the binder may be contained in an amount of 1 to 5 wt% Or so and the solvent 10 to 50 wt% or so. Further, the pastes may include, in accordance with need, various types of additives selected from dispersants, plasticizers, dielectrics, insulators, etc. The total content of these is preferably not more than 10 wt%.

When using a printing method, the dielectric layer paste and the internal electrode layer paste are successively printed on the PET or other substrate. The result is then cut into a predetermined shape, then the pastes are peeled off from the substrate to form a green chip.

Further, when using a sheet method, a dielectric layer paste is used to form a green sheet, the internal electrode layer paste is printed on top of this, then these are stacked to form a green chip.

Before sintering, the green chip is processed to remove the binder. This processing for removing the binder may be performed under ordinary conditions, but when using Ni or an Ni alloy or other base metal for the electroconductive material of the internal electrode layer, this is preferably performed under the following conditions:

Rate of temperature rise: 5 to 300° C./hour, in particular 10 to 100° C./hour

Holding temperature: 180 to 400° C., in particular 200 to 300° C.

Temperature holding time: 0.5 to 24 hours, in particular 5 to 20 hours

Atmosphere: in the air

The atmosphere when sintering the green chip may be suitably determined in accordance with the type of the electroconductive material in the internal electrode layer paste, but when using Ni or an Ni alloy or other base metal as the electroconductive material, the oxygen partial pressure in the sintering atmosphere is preferably made $10^{-8}$ to $10^{-15}$ atmospheres. If the oxygen partial pressure is less than this range, the electroconductive material of the internal electrode layers becomes abnormally sintered and ends up breaking in the middle in some cases. Further, if the oxygen partial pressure is more than the above range, the internal electrode layers tend to oxidize.

Further, the holding temperature at the time of sintering is preferably 1100 to 1400° C., more preferably 1200 to 1360° C., still more preferably 1200 to 1320° C. If the holding temperature is less than the above range, the densification becomes insufficient, while if over that range, there is a tendency toward breaking of the electrodes due to abnormal sintering of the internal electrode layers, deterioration of the capacity-temperature characteristic due to dispersion of the material comprising the internal electrode layers, and reduction of the dielectric ceramic composition.

The various conditions other than the above conditions are preferably selected from the following ranges:

Rate of temperature rise: 50 to 500° C./hour, in particular 200 to 300° C./hour

Temperature holding time: 0.5 to 8 hours, in particular 1 to 3 hours

Cooling rate: 50 to 500° C./hour, in particular 200 to 300° C./hour

Note that the sintering atmosphere is preferably a reducing atmosphere. As the atmospheric gas, for example, it is preferable to use a wet mixed gas of $N_2$ and $H_2$.

When sintering in a reducing atmosphere, the capacitor device body is preferably annealed. The annealing process is for reoxidizing the dielectric layer. Since this enables the IR lifetime to be remarkably prolonged, the reliability is improved.

The oxygen partial pressure in the annealing atmosphere is preferably not less than $10^{-9}$ atmospheres, in particular $10^{-6}$ to $10^{-8}$ atmospheres. If the oxygen partial pressure is less than the above range, reoxidation of the dielectric layer is difficult, while if over that range, the internal electrode layers tend to oxide.

The holding temperature at the time of annealing is preferably not more than 1100° C., in particular 500 to 1100° C. If the holding temperature is less than the above range, the oxidation of the dielectric layers becomes insufficient, so the IR tends to become low and the IR lifetime short. On the other hand, when the holding temperature exceeds the above range, not only do the internal electrode layers oxidize and the capacity fall, but also the internal electrode layers end up reacting with the dielectric material resulting in a tendency toward deterioration of the capacity-temperature characteristic, a fall in the IR, and a fall in the IR lifetime. Note that the annealing may be comprised of only a temperature raising process and temperature reducing process. That is, the temperature holding time may also be made zero. In this case, the holding temperature is synonomous with the maximum temperature.

The various conditions other than the above conditions are preferably determined from the following ranges:

Temperature holding time: 0 to 20 hours, in particular 6 to 10 hours

Cooling rate: 50 to 500° C./hour, in particular 100 to 300° C./hour

Note that for the atmospheric gas, wet $N_2$ gas etc. may be used.

In the processing for removing the binder, the sintering, and the annealing, for example, a wetter etc. may be used to wet the $N_2$ gas or mixed gas. In this case, the temperature of the water is preferably 5 to 75° C.

The processing for removing the binder, sintering, and annealing may be performed consecutively or independently. When preferably performing these consecutively, after processing to remove the binder, the atmosphere is changed without cooling, then the temperature is raised to the holding temperature for sintering, the sintering performed, then the chip is cooled, the atmosphere is changed when the holding temperature of the annealing is reached, and then annealing is performed. On the other hand, when performing these independently, at the time of sintering, preferably the temperature is raised to the holding temperature at the time of the processing for removing the binder in an $N_2$ gas or wet $N_2$ gas atmosphere, then the atmosphere is changed and the temperature is further raised. Preferably, the chip is cooled to the holding temperature of the annealing, then the atmosphere changed again to an $N_2$ gas or wet $N_2$ gas atmosphere and the cooling continued. Further, at the time of annealing, the temperature may be raised to the holding temperature in an $N_2$ gas atmosphere, then the atmosphere changed or the entire annealing process may be performed in a wet $N_2$ gas atmosphere.

The thus obtained capacitor device body is, for example, end polished using barrel polishing or sandblasting etc., then printed or transferred with an external electrode paste and sintered to form the external electrodes 4. The sintering conditions of the external electrode paste are for example preferably 600 to 800° C. for 10 minutes to 1 hour or so in a wet mixed gas of $N_2$ and $H_2$. Further, in accordance with need, the surfaces of the external electrodes 4 may be formed with a covering layer using plating technique etc.

The thus produced multi-layer ceramic capacitor of the present invention is mounted by soldering it onto a printed circuit board for use in various types of electronic equipment.

Note that the present invention is not limited to the above embodiments and may be modified in various ways within the scope of the invention.

For example, in the above embodiments, illustration was made of a multi-layer ceramic capacitor as the electronic device according to the present invention, but the electronic device according to the present invention is not limited to a multi-layer ceramic capacitor and may be any device having a dielectric layer comprised of a dielectric ceramic composition of the above composition.

[EXAMPLES]

Below, the present invention will be explained with reference to more detailed examples, but the present invention is not limited to these examples.

EXAMPLE 1

Samples of multi-layer ceramic capacitors were fabricated by the procedure explained below.

First, the following pastes were prepared.

Dielectric Layer Paste

Ingredients of the main component and ingredients of the subcomponents with particle sizes of 0.1 to 1 $\mu$m were prepared. A carbonate was used for the ingredients of MgO and MnO and an oxide was used for the other ingredients. Further, $(Ba_{0.6}Ca_{0.4})SiO_3$ was used for the ingredient of the second subcomponent. Note that $(Ba_{0.6}Ca_{0.4})SiO_3$ was produced by wet mixing $BaCO_3$, $CaCO_3$, and $SiO_2$ using a ball mill for 16 hours, drying the mixture, sintering it at 1150° C. in air, then wet pulverizing it using a ball mill for 100 hours.

These ingredients were blended to give compositions after sintering shown in the following Table 1 to Table 4. These were wet-mixed using a ball mill, then dried.

100 parts by weight of the dried ingredient of the dielectric, 4.8 parts by weight of acrylic resin, 40 parts by weight of methylene chloride, 20 parts by weight of ethyl acetate, 6 parts by weight of mineral spirits, and 4 parts by weight of acetone were mixed using a ball mill to make a paste.

Internal Electrode Layer Paste 100 parts by weight of Ni particles of an average particle size of 0.2 to 0.8 $\mu$m, 40 parts by weight of an organic vehicle (8 parts by weight of an ethyl cellulose resin dissolved in 92 parts by weight of butyl carbitol), and 10 parts by weight of butyl carbitol were kneaded using a triple-roll to make a paste.

External Electrode Paste 100 parts by weight of Cu particles of an average particle size of 0.5 $\mu$m, 35 parts by weight of an organic vehicle (8 parts by weight of an ethyl cellulose resin dissolved in 92 parts by weight of butyl carbitol), and 7 parts by weight of butyl carbitol were kneaded together to make a paste.

Preparation of Green Chip

The above dielectric layer paste was used to form a green sheet on a PET film. An internal electrode paste was printed on this, then the sheet was peeled from the PET film. Next, the green sheets and protective green sheets (ones without the internal electrode layer paste printed on it) were stacked and pressed to obtain a green chip.

Sintering

First, the green chip was cut to a predetermined size and was processed to remove the binder, sintered, and annealed under the following conditions, then formed with external electrodes to obtain the multi-layer ceramic capacitor of the configuration shown in FIG. 1.

Conditions for Processing to Remove Binder

Rate of temperature rise: 15° C./hour

Holding temperature: 280° C.

Temperature holding time: 8 hours

Atmosphere: in the air

Sintering Conditions

Rate of temperature rise: 200° C./hour

Holding temperature: temperature shown in Table 1 to Table 4

Temperature holding time: 2 hours

Cooling rate: 300° C./hour

Atmospheric gas: wet $N_2+H_2$ mixed gas

Oxygen partial pressure: $10^{-11}$ atmospheres

Annealing Conditions

Holding temperature: 900° C.

Temperature holding time: 9 hours cooling rate: 300° C./hour

Atmospheric gas: wet $N_2$ gas

Oxygen partial pressure: $10^{-7}$ atmospheres

Note that for the wetting of the atmospheric gas at the time of sintering and annealing, a wetter with a water temperature of 35° C. was used.

External Electrodes

The external electrodes were formed by polishing the end faces of the sintered body by sandblasting, then transferring the external electrode paste to the end faces and sintering them there in a wet $N_2+H_2$ atmosphere at 800° C. for 10 minutes.

The thus obtained samples had a size of 3.2 mm ×1.6 mm ×0.6 mm, had four dielectric layers sandwiched between internal electrode layers, and had a thickness of 10 μm. The thickness of each internal electrode layer was 2.0 μm.

Further, for comparison, samples not containing the fourth subcomponent and samples containing other rare earth elements instead of the rate earth elements of the fourth subcomponent were also prepared. The other rare earth elements are listed in the columns of the fourth subcomponent in the tables.

Disk-shaped samples were also prepared in addition to the samples of the capacitors. These disk-shaped samples were of the same compositions of the samples of the above capacitors and were sintered under the same conditions. In-Ga electrodes of diameters of 5 mm were coated on the two surfaces of the samples.

The samples were evaluated as to the following characteristics.

Relative Dielectric Constant ($\epsilon_r$) and Dielectric Loss (tan δ)

The capacity and tan δ of the disk-shaped samples were measured at 25° C. by an LCR meter under conditions of 1 kHz and 1 Vrms. Further, the relative dielectric constant was calculated from the capacity, electrode dimensions, and thickness of the samples. The results are shown in the tables.

Insulation Resistance (R25)

The specific resistance at 25° C. was measured for the disk-shaped samples. The specific resistance was measured by an insulator resistance meter (R8340A(50V-1 minute value) made by Advantest Co.). The results are shown in the tables.

Temperature Characteristic of Capacity

Figure 2:
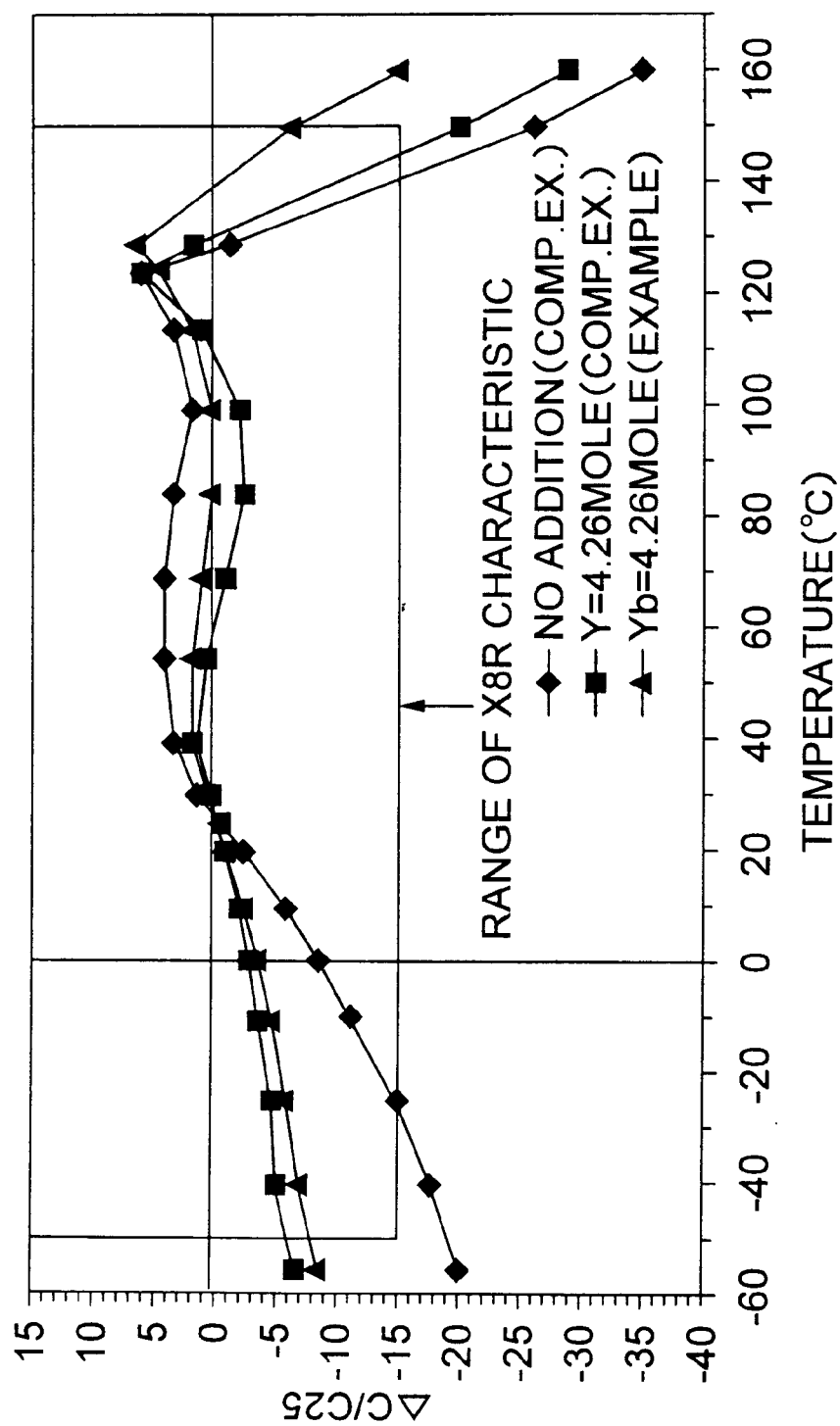
FIG. 2 is a graph of the capacity-temperature characteristic of the capacitor.

The capacity of samples of capacitors having a thickness of the dielectric layers of 10 μm was measured in a temperature range of –55 to 160° C. to investigate if the X8R characteristic was satisfied. Samples which satisfied it are shown in the tables by "O" and samples not satisfying them by "X". Further, samples containing Yb were selected as examples of the present invention, while samples containing Y and samples not containing a rare earth element were selected as comparative examples. The capacity-temperature characteristics of these samples at –55° C. to 160° C. are shown in FIG. 2. FIG. 2 also shows the short scope satisfying the X8R characteristic. Note that for the measurement, an LCR meter was used and the measurement voltage was made 1V.

X-Ray Diffraction

Disk-shaped samples were measured by a powder X-ray (Cu—Kα—ray) diffraction apapratus between 2θ=44 to 46° under the following conditions to measure the half width of the pseudo cubic peak comprised of the (002) peak and (200) peak superposed. The samples with a half width of not less than 0.3° were indicated in the tables as "O" and samples with ones less than 0.3° as "X". Further, the intensity I(002) of the (002) peak and the intensity I(200) of the (200) peak were measured to investigate if $I(002) \geq I(200)$ was satisfied. Samples which satisfied it were indicated in the tables as "O" and those not satisfying it as "X". Note that the measurement was conducted at room temperature.

X-ray generation conditions: 40 kV–40 mA

Scan width: 0.01°

Scan rate: 0.05° /minute

X-ray detection conditions

Parallel slits: 0.5°

Dispersion slits: 0.5°

Light receiving slits: 0.15 mm

Figure 3:
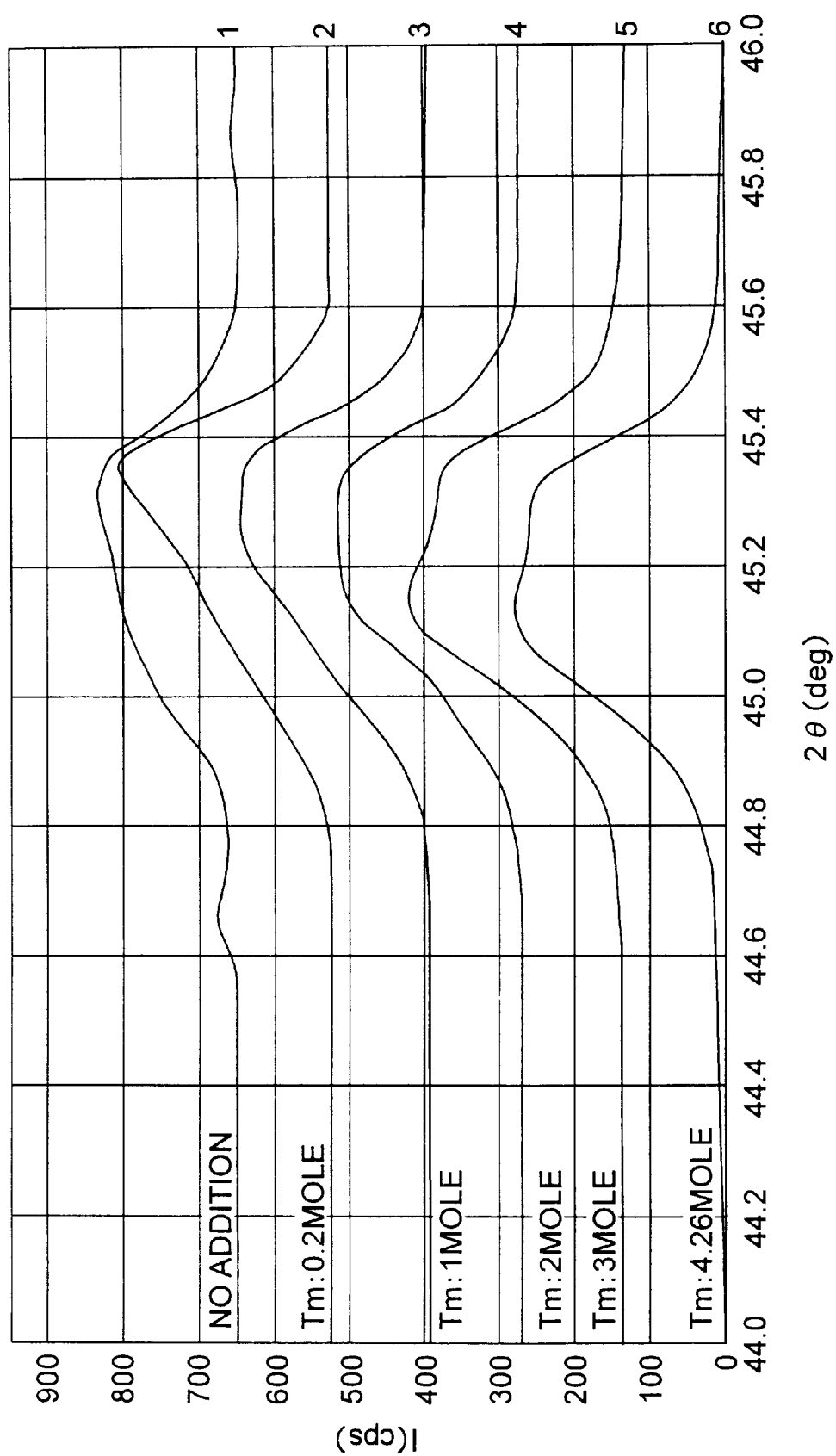
FIG. 3 is an X-ray diffraction chart in the range of 2θ=44 to 46° of a dielectric ceramic composition containing Tm.
Figure 4:
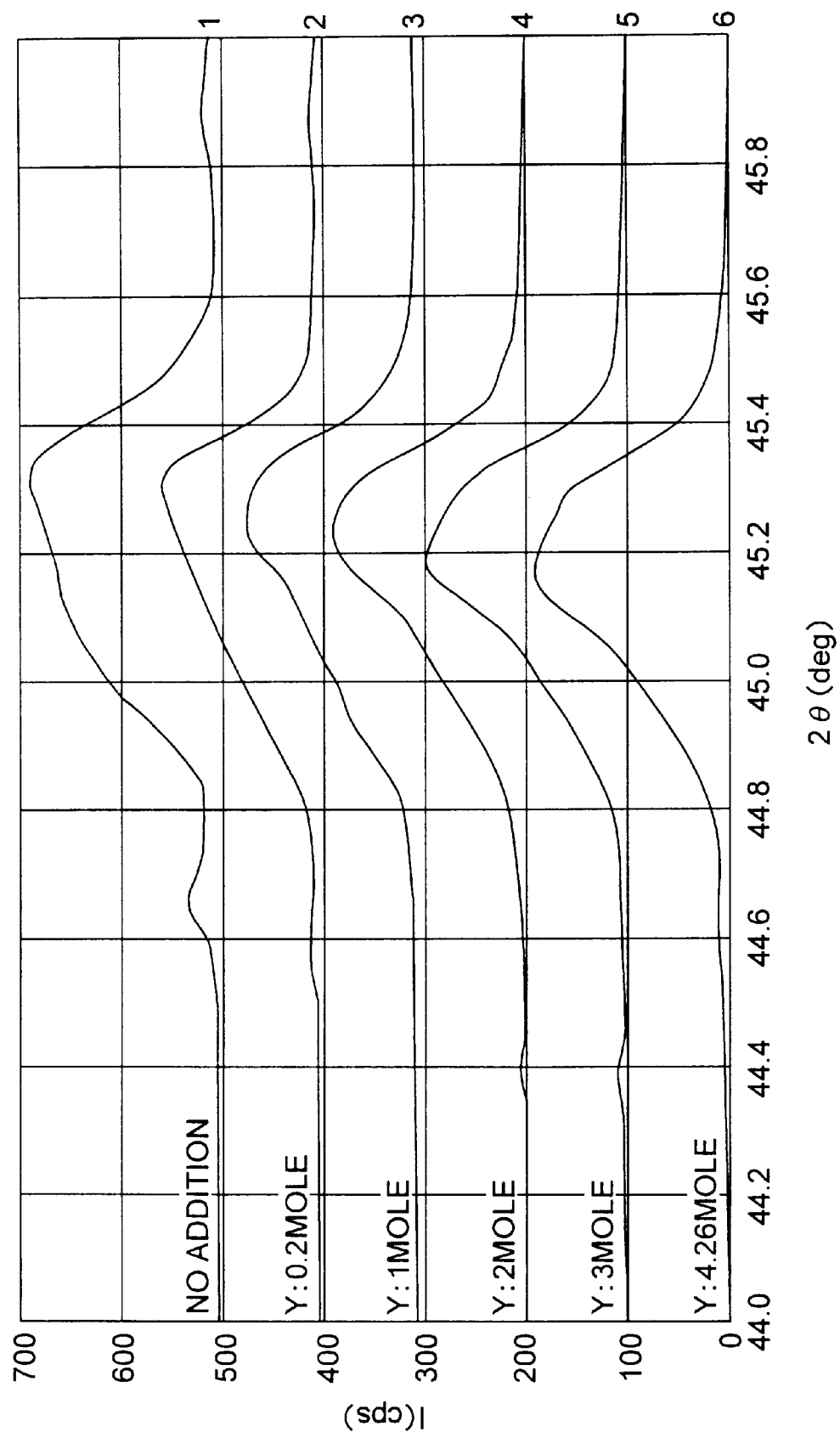
FIG. 4 is an X-ray diffraction chart in the range of 2θ=44 to 46° of a dielectric ceramic composition containing Y.

Note that when finding the half width, the data was divided into that for the Kα1 rays and that for the Kα2 rays and the data for the Kα1 rays used. The X-ray diffraction charts of the samples containing Tm and containing Y among those sample, shown in the tables are shown in FIG. 3 and FIG. 4. Note that these figures show also compositions not containing rare earth elements.

IR Lifetime under Direct Current Electric Field

Samples of capacitors having the compositions shown in Table 1 to Table 4 and having a thickness of the dielectric layers of 10 μm were subjected to acceleration tests at 200° C. under a field of 10 V/μm. The time until the insulation resistance fell below 1 MΩ was made the lifetime. The results are shown in Table 1 to Table 4. Note that a sample having a composition not containing the fourth subcomponent was also measured. The results are shown in Table 2.

TABLE 1

2$^{nd}$ Subcomponent: $(Ba_{0.6}Ca_{0.4})SiO_3$,
3rd Subcomponent: $V_2O_5$, 6th Subcomponent: MnO

| Comp. No. | Type | 1st (mol) | 2nd (mol) | 3rd (mol) | Type | 4th (mol) | 6th (mol) | Sinter temp. (° C.) | ε r | tan δ (%) | R25 (Ω cm) | X8R char. | Half width | Int. ratio | IR life (hr) |
|---|---|---|---|---|---|---|---|---|---|---|---|---|---|---|---|
| 101 (Comp.E) | MgO | 2.06 | 3.0 | 0.01 | — | —* | 0.374 | 1280 | 2912 | 0.68 | $7.64 \times 10^{12}$ | x | x | x | 1.1 |
| 102 (Comp.E) | MgO | 2.06 | 3.0 | 0.01 | Er | 0.20* | 0.374 | 1280 | 3038 | 0.70 | $7.05 \times 10^{12}$ | x | x | x | 16.5 |
| 103 (Comp.E) | MgO | 2.06 | 3.0 | 0.01 | Tm | 0.20* | 0.374 | 1280 | 3086 | 0.70 | $7.04 \times 10^{12}$ | x | x | x | 10.3 |
| 104 (Comp.E) | MgO | 2.06 | 3.0 | 0.01 | Yb | 0.20* | 0.374 | 1280 | 3080 | 0.69 | $7.90 \times 10^{12}$ | x | x | x | 6.2 |
| 105 (Comp.E) | MgO | 2.06 | 3.0 | 0.01 | Lu | 0.20* | 0.374 | 1280 | 3044 | 0.63 | $8.63 \times 10^{12}$ | x | x | x | 0.5 |
| 106 | MgO | 2.06 | 3.0 | 0.01 | Er | 1.00 | 0.374 | 1280 | 2592 | 0.53 | $1.44 \times 10^{13}$ | o | o | o | 33.5 |
| 107 | MgO | 2.06 | 3.0 | 0.01 | Tm | 1.00 | 0.374 | 1280 | 2544 | 0.48 | $1.48 \times 10^{13}$ | o | o | o | 21.3 |
| 108 | MgO | 2.06 | 3.0 | 0.01 | Yb | 1.00 | 0.374 | 1280 | 2458 | 0.52 | $1.48 \times 10^{13}$ | o | o | o | 8.0 |
| 109 | MgO | 2.06 | 3.0 | 0.01 | Lu | 1.00 | 0.374 | 1280 | 2569 | 0.51 | $1.57 \times 10^{13}$ | o | o | o | 4.0 |
| 110 | MgO | 2.06 | 3.0 | 0.01 | Sc | 1.00 | 0.374 | 1280 | 3068 | 0.49 | $8.07 \times 10^{12}$ | o | o | o | 2.0 |
| 111 | MgO | 2.06 | 3.0 | 0.01 | Er | 2.00 | 0.374 | 1280 | 2431 | 0.51 | $1.15 \times 10^{13}$ | o | o | o | 42.0 |
| 112 | MgO | 2.06 | 3.0 | 0.01 | Tm | 2.00 | 0.374 | 1280 | 2500 | 0.48 | $1.34 \times 10^{13}$ | o | o | o | 31.5 |
| 113 | MgO | 2.06 | 3.0 | 0.01 | Yb | 2.00 | 0.374 | 1280 | 2455 | 0.49 | $1.55 \times 10^{13}$ | o | o | o | 10.0 |

TABLE 1-continued

2$^{nd}$ Subcomponent: $(Ba_{0.6},Ca_{0.4})SiO_3$,
3rd Subcomponent: $V_2O_5$, 6th Subcomponent: MnO

| Comp. No. | Subcomponents | | | | | | Sinter temp. (°C.) | $\epsilon r$ | tan δ (%) | R25 ($\Omega$ cm) | X-ray dif. | | | IR life (hr) |
|---|---|---|---|---|---|---|---|---|---|---|---|---|---|---|
| | Type | 1st (mol) | 2nd (mol) | 3rd (mol) | Type | 4th (mol) | 6th (mol) | | | | | X8R char. | Half width | Int. ratio | |
| 114 | MgO | 2.06 | 3.0 | 0.01 | Lu | 2.00 | 0.374 | 1280 | 2479 | 0.49 | $1.08 \times 10^{13}$ | ○ | ○ | ○ | 4.9 |
| 115 | MgO | 2.06 | 3.0 | 0.01 | Sc | 2.00 | 0.375 | 1340 | 2201 | 1.40 | $2.55 \times 10^{11}$ | ○ | ○ | ○ | 3.5 |
| 116 | MgO | 2.06 | 3.0 | 0.01 | Er | 3.00 | 0.374 | 1280 | 2355 | 0.54 | $1.61 \times 10^{13}$ | ○ | ○ | ○ | 83.0 |
| 117 | MgO | 2.06 | 3.0 | 0.01 | Tm | 3.00 | 0.374 | 1280 | 2192 | 0.47 | $2.41 \times 10^{13}$ | ○ | ○ | ○ | 38.0 |
| 118 | MgO | 2.06 | 3.0 | 0.01 | Yb | 3.00 | 0.374 | 1280 | 2149 | 0.46 | $2.16 \times 10^{13}$ | ○ | ○ | ○ | 9.4 |
| 119 | MgO | 2.06 | 3.0 | 0.01 | Lu | 3.00 | 0.374 | 1280 | 2088 | 0.46 | $3.15 \times 10^{13}$ | ○ | ○ | ○ | 3.5 |
| 120 | MgO | 2.06 | 3.0 | 0.01 | Sc | 3.00 | 3.000 | 1340 | 2078 | 1.43 | $4.83 \times 10^{11}$ | ○ | ○ | ○ | 3.0 |

TABLE 2

2$^{nd}$ Subcomponent: $(Ba_{0.6},Ca_{0.4})SiO_3$,
3$^{rd}$ Subcomponent: $V_2O_5$, 6$^{th}$ Subcomponent: MnO

| Comp. No. | Subcomponents | | | | | | | Sinter temp. (°C.) | $\epsilon r$ | tan δ (%) | R25 ($\Omega$ cm) | X-ray dif. | | | IR life (hr) |
|---|---|---|---|---|---|---|---|---|---|---|---|---|---|---|---|
| | Type | 1st (mol) | 2nd (mol) | 3rd (mol) | Type | 4th (mol) | 6th (mol) | | | | | X8R char. | Half width | Int. ratio | |
| 101 (Comp.E) | MgO | 2.06 | 3.0 | 0.01 | —* | — | 0.374 | 1280 | 2912 | 0.68 | $7.64 \times 10^{12}$ | x | x | x | 0.35 |
| 201 (Comp.E) | MgO | 2.06 | 3.0 | 0.01 | Y* | 4.26 | 0.374 | 1280 | 2481 | 0.61 | $2.10 \times 10^{13}$ | x | x | x | 240.92 |
| 202 (Comp.E) | MgO | 2.06 | 3.0 | 0.01 | La* | 4.26 | 0.374 | 1280 | — | — | Semicond. | x | x | x | — |
| 203 (Comp.E) | MgO | 2.06 | 3.0 | 0.01 | Ce* | 4.26 | 0.374 | 1280 | — | — | Semicond. | x | x | x | — |
| 204 (Comp.E) | MgO | 2.06 | 3.0 | 0.01 | Pr* | 4.26 | 0.374 | 1280 | — | — | Semicond. | x | x | x | — |
| 205 (Comp.E) | MgO | 2.06 | 3.0 | 0.01 | Sm* | 4.26 | 0.374 | 1280 | — | — | Semicond. | x | x | x | — |
| 206 (Comp.E) | MgO | 2.06 | 3.0 | 0.01 | Eu* | 4.26 | 0.374 | 1280 | 2161 | 1.83 | $3.82 \times 10^{10}$ | x | x | x | 0 |
| 207 (Comp.E) | MgO | 2.06 | 3.0 | 0.01 | Gd* | 4.26 | 0.374 | 1280 | — | — | $1.62 \times 10^{5}$ (Semicond.) | x | x | x | — |
| 208 (Comp.E) | MgO | 2.06 | 3.0 | 0.01 | Tb* | 4.26 | 0.374 | 1280 | 2583 | 1.94 | $2.14 \times 10^{12}$ | x | x | x | 23.5 |
| 209 (Comp.E) | MgO | 2.06 | 3.0 | 0.01 | Dy* | 4.26 | 0.374 | 1280 | 2816 | 0.62 | $1.70 \times 10^{13}$ | x | x | x | 100.0 |
| 210 (Comp.E) | MgO | 2.06 | 3.0 | 0.01 | Ho* | 4.26 | 0.374 | 1280 | 2605 | 0.61 | $1.64 \times 10^{13}$ | x | x | x | 222.67 |
| 211 | MgO | 2.06 | 3.0 | 0.01 | Er | 4.26 | 0.374 | 1280 | 2528 | 0.63 | $1.79 \times 10^{13}$ | ○ | ○ | ○ | 143.52 |
| 212 | MgO | 2.06 | 3.0 | 0.01 | Tm | 4.26 | 0.374 | 1280 | 2505 | 0.57 | $1.44 \times 10^{13}$ | ○ | ○ | ○ | 30.55 |
| 213 | MgO | 2.06 | 3.0 | 0.01 | Yb | 4.26 | 0.374 | 1280 | 2213 | 0.52 | $2.04 \times 10^{13}$ | ○ | ○ | ○ | 7.44 |
| 214 | MgO | 2.06 | 3.0 | 0.01 | Lu | 4.26 | 0.374 | 1280 | 2111 | 0.52 | $2.02 \times 10^{13}$ | ○ | ○ | ○ | 3.17 |
| 215 | MgO | 2.06 | 3.0 | 0.01 | Sc | 4.26 | 0.374 | 1280 | 1892 | 0.42 | $2.45 \times 10^{13}$ | ○ | ○ | ○ | 1.2 |

TABLE 3

2$^{nd}$ Subcomponent: $(Ba_{0.6},Ca_{0.4})SiO_3$,
3$^{rd}$ Subcomponent: $V_2O_5$, 6$^{th}$ Subcomponent: MnO

| Comp. No. | Subcomponents | | | | | | | Sinter temp. (°C.) | $\epsilon r$ | tan δ (%) | R25 ($\Omega$ cm) | X-ray dif. | | | IR life (hr) |
|---|---|---|---|---|---|---|---|---|---|---|---|---|---|---|---|
| | Type | 1st (mol) | 2nd (mol) | 3rd (mol) | Type | 4th (mol) | 6th (mol) | | | | | X8R char. | Half width | Int. ratio | |
| 301 | MgO | 2.06 | 3.0 | 0.05 | Yb | 4.26 | 0.374 | 1280 | 2314 | 0.42 | $1.11 \times 10^{12}$ | ○ | ○ | ○ | 7.40 |
| 302 | MgO | 2.06 | 3.0 | 0.10 | Yb | 4.26 | 0.374 | 1280 | 2320 | 0.41 | $1.46 \times 10^{12}$ | ○ | ○ | ○ | 26.43 |
| 303 | MgO | 2.06 | 3.0 | 0.15 | Yb | 4.26 | 0.374 | 1280 | 2247 | 0.44 | $4.55 \times 10^{11}$ | ○ | ○ | ○ | 34.75 |
| 304 | MgO | 2.06 | 3.0 | 0.20 | Yb | 4.26 | 0.374 | 1280 | 2225 | 0.41 | $2.00 \times 10^{12}$ | ○ | ○ | ○ | 38.2 |
| 305 | MgO | 2.06 | 3.0 | 0.25 | Yb | 4.26 | 0.374 | 1280 | 2242 | 0.59 | $7.99 \times 10^{11}$ | ○ | ○ | ○ | 40.00 |
| 306 | MgO | 2.06 | 3.5 | 0.01 | Yb | 4.26 | 0.374 | 1280 | 2510 | 0.48 | $3.73 \times 10^{12}$ | ○ | ○ | ○ | 23.35 |
| 307 | MgO | 2.06 | 4.0 | 0.01 | Yb | 4.26 | 0.374 | 1280 | 2466 | 0.50 | $5.42 \times 10^{12}$ | ○ | ○ | ○ | 14.47 |
| 308 | MgO | 2.06 | 4.5 | 0.01 | Yb | 4.26 | 0.374 | 1280 | 2371 | 0.52 | $8.06 \times 10^{12}$ | ○ | ○ | ○ | 23.03 |

TABLE 3-continued

2nd Subcomponent: $(Ba_{0.6},Ca_{0.4})SiO_3$,
3rd Subcomponent: $V_2O_5$, 6th Subcomponent: MnO

| Comp. No. | Type | 1st (mol) | 2nd (mol) | 3rd (mol) | Type | 4th (mol) | 6th (mol) | Sinter temp. (° C.) | εr | tan δ (%) | R25 (Ω cm) | X8R char. | Half width | Int. ratio | IR life (hr) |
|---|---|---|---|---|---|---|---|---|---|---|---|---|---|---|---|
| 309 | MgO | 2.06 | 5.0 | 0.01 | Yb | 4.26 | 0.374 | 1280 | 2451 | 0.54 | $1.74 \times 10^{13}$ | ○ | ○ | ○ | 21.32 |
| 310 | MgO | 2.06 | 6.0 | 0.01 | Yb | 4.26 | 0.374 | 1280 | 2386 | 0.58 | $2.14 \times 10^{13}$ | ○ | ○ | ○ | 8.90 |
| 311 | MgO | 0.10 | 3.0 | 0.01 | Yb | 4.26 | 0.374 | 1280 | 2806 | 0.73 | $5.14 \times 10^{11}$ | ○ | ○ | ○ | 9.88 |
| 312 | MgO | 0.50 | 3.0 | 0.01 | Yb | 4.26 | 0.374 | 1280 | 2722 | 0.64 | $5.51 \times 10^{12}$ | ○ | ○ | ○ | 15.77 |
| 313 | MgO | 1.00 | 3.0 | 0.01 | Yb | 4.26 | 0.374 | 1280 | 2349 | 0.57 | $9.86 \times 10^{12}$ | ○ | ○ | ○ | 16.95 |
| 314 | MgO | 1.50 | 3.0 | 0.01 | Yb | 4.26 | 0.374 | 1280 | 2365 | 0.60 | $7.52 \times 10^{12}$ | ○ | ○ | ○ | 16.00 |
| 315 | MgO | 2.50 | 3.0 | 0.01 | Yb | 4.26 | 0.374 | 1280 | 2317 | 0.64 | $8.29 \times 10^{12}$ | ○ | ○ | ○ | 7.67 |
| 316 | MgO | 3.00 | 3.0 | 0.01 | Yb | 4.26 | 0.374 | 1280 | 2318 | 0.61 | $1.12 \times 10^{13}$ | ○ | ○ | ○ | 4.00 |
| 317 (Comp.E) | MgO | 2.06 | 3.0 | 0* | Yb | 4.26 | 0.375 | 1280 | 2273 | 0.74 | $1.60 \times 10^{13}$ | ○ | ○ | ○ | 0 |
| 318 | MgO | 2.06 | 3.0 | 0.50 | Yb | 4.26 | 0.375 | 1280 | 2033 | 1.12 | $1.17 \times 10^{10}$ | ○ | ○ | ○ | 220 |
| 319 | MgO | 2.06 | 2.0 | 0.01 | Yb | 4.26 | 0.375 | 1280 | 1959 | 0.51 | $6.45 \times 10^{12}$ | ○ | ○ | ○ | 4.4 |
| 320 | MgO | 2.06 | 8.0 | 0.01 | Yb | 4.26 | 0.375 | 1280 | 1667 | 1.12 | $1.30 \times 10^{10}$ | ○ | ○ | ○ | 2.1 |

TABLE 4

2nd Subcomponent: $(Ba_{0.6},Ca_{0.4})SiO_3$,
3rd Subcomponent: $V_2O_5$, 6th Subcomponent: MnO

| Comp. No. | Type | 1st (mol) | 2nd (mol) | 3rd (mol) | Type | 4th (mol) | 6th (mol) | Sinter temp. (° C.) | εr | tan δ (%) | R25 (Ω cm) | X8R char. | Half width | Int. ratio | IR life (hr) |
|---|---|---|---|---|---|---|---|---|---|---|---|---|---|---|---|
| 401 | MgO Cr$_2$O$_3$ | 2.06 0.374 | 3.0 | 0.01 | Yb | 4.26 | — | 1280 | 2431 | 0.62 | $1.41 \times 10^{12}$ | ○ | ○ | ○ | 4.5 |
| 402 | Cr$_2$O$_3$ | 1.03 | 3.0 | 0.01 | Yb | 4.26 | 0.374 | 1280 | 3161 | 0.65 | $3.74 \times 10^{12}$ | ○ | ○ | ○ | 1.3 |
| 403 | CaO | 1.03 | 3.0 | 0.01 | Yb | 4.26 | 0.374 | 1320 | 3157 | 0.01 | $3.5 \times 10^{12}$ | ○ | ○ | ○ | 6.3 |
| 404 | CaO | 2.06 | 3.0 | 0.01 | Yb | 4.26 | 0.374 | 1280 | 2949 | 0.59 | $5.26 \times 10^{12}$ | ○ | ○ | ○ | 1.0 |
| 405 | BaO | 1.03 | 3.0 | 0.01 | Yb | 4.26 | 0.374 | 1320 | 1473 | 0.01 | $3.7 \times 10^{12}$ | ○ | ○ | ○ | 1.7 |
| 406 | BaO | 2.06 | 3.0 | 0.01 | Yb | 4.26 | 0.374 | 1320 | 2751 | 0.01 | $1.2 \times 10^{12}$ | ○ | ○ | ○ | 1.4 |
| 407 | SrO | 1.03 | 3.0 | 0.01 | Yb | 4.26 | 0.374 | 1320 | 2996 | 0.01 | $1.4 \times 10^{12}$ | ○ | ○ | ○ | 1.8 |
| 408 | SrO | 2.06 | 3.0 | 0.01 | Yb | 4.26 | 0.374 | 1320 | 2332 | 0.02 | $2 \times 10^{11}$ | ○ | ○ | ○ | 1.7 |
| 409 | MgO | 2.06 | 3.0 | 0.01 | Er | 7.00 | 0.374 | 1320 | 1862 | 0.04 | $2.1 \times 10^{12}$ | ○ | ○ | ○ | 62 |
| 410 | MgO | 2.06 | 3.0 | 0.01 | Yb | 7.00 | 0.374 | 1320 | 2375 | 0.02 | $1.0 \times 10^{11}$ | ○ | ○ | ○ | 1.5 |
| 411 (Comp.E) | MgO | 2.06 | 3.0 | 0.01 | Er | 10.00* | 0.374 | 1280 | 1920 | 0.92 | $1.20 \times 10^{9}$ | ○ | ○ | ○ | 0 |
| 412 (Comp.E) | MgO | 2.06 | 3.0 | 0.01 | Yb | 10.00* | 0.374 | 1280 | 1044 | 1.27 | $1.93 \times 10^{8}$ | ○ | ○ | ○ | 0 |
| 413 (Comp.E) | MgO | 2.06 | 3.0 | 0.01 | Sc | 10.00* | 0.374 | 1280 | 1805 | 0.80 | $5.38 \times 10^{10}$ | ○ | ○ | ○ | 0 |

From the results shown in the above tables, it was learned that samples of the examples containing predetermined amounts of the fourth subcomponent satisfy the X8R characteristic and further have sufficiently high relative dielectric constants and insulation resistances and are free from the problem of dielectric loss. Note that the samples of the examples satisfied the B characteristic of the above EIAJ standard and the X7R characteristic of the EIA standard in addition to the X8R characteristic.

Further, it was learned that samples of the examples containing the fourth subcomponent and satisfying the X8R characteristic had half widths in X-ray diffraction and the relationship of intensity of the two peaks satisfying the conditions limited by the present invention.

Further, from the results shown in Table 2 and Table 3, it was confirmed that a sufficient IR lifetime can be obtained by inclusion of the fourth subcomponent. Note that if the lifetime is more than 1 hour under these conditions, the IR lifetime can be said to be sufficient.

Further, the samples in the tables were examined for structure by a scan type electron microscope and measured for density. As a result, it was confirmed that samples with a content of the fourth subcomponent of at least 10 moles had an insufficient sinterability in the range of a sintering temperature of 1280 to 1320° C. If the sinterability is insufficient, as shown by Composition Nos. 411 to 413 in Table 4 (comparative examples), the dielectric loss, relative dielectric constant, IR lifetime, and other characteristics end up falling and the moisture resistance and strength also become insufficient. Note that it is possible to improve the sinterability by further raising the sintering temperature, but if sintering at a high temperature of over 1320° C., the internal electrode layers tend to break and the dielectric ceramic composition tends to be reduced.

EXAMPLE 2

Samples having the compositions shown in the following Table 5 were prepared in the same way as in Example 1. These samples were ones using a Yb oxide as the fourth subcomponent and having a Y oxide added as the fifth subcomponent. These samples were measured in the same way as with Example 1. The results are shown in Table 5.

TABLE 5

1st Subcomponent: MgO (2.06 mol)
2nd Subcomponent: $(Ba_{0.6},Ca_{0.4})SiO_3$ (3.0 mol)
3rd Subcomponent: $V_2O_5$ (0.01 mol)
6th Subcomponent: MnO: 0.374 mole

| Comp. No. | Yb (mol) | Y (mol) | ∈r | tan δ (%) | R25 (Ω cm) | X8R char. | IR life (hr) |
|---|---|---|---|---|---|---|---|
| 501 | 4.0 | 0.1 | 2219 | 0.51 | $1.57 \times 10^{13}$ | ○ | 5.4 |
| 502 | 4.0 | 0.3 | 2219 | 0.53 | $1.08 \times 10^{13}$ | ○ | 10.0 |
| 503 | 4.0 | 0.6 | 2394 | 0.70 | $3.15 \times 10^{13}$ | ○ | 17.7 |
| 504 | 4.0 | 1.0 | 2469 | 0.66 | $2.02 \times 10^{13}$ | ○ | 26.7 |

From Table 5, it was confirmed that the IR lifetime is improved by adding a Y (fifth subcomponent) in addition to a Yb oxide (fourth subcomponent). Further, it confirmed that no adverse effects could be observed in the other characteristics to the addition of the Y oxide.

EXAMPLE 3

Samples were prepared in the same way as with Composition No. 213 of Example 1 except for making the composition of the second subcomponent one shown in the following Table 6. These samples were measured in the same way as with Example 1. The results are shown in Table 6. Note that in Table 6, Composition No. 603 corresponds to Composition No. 213 in Table 2.

TABLE 6

| Comp. No. | 2nd subcomp. | ∈r | tan δ (%) | R25 (Ω cm) | X8R char. | IR life (hr) |
|---|---|---|---|---|---|---|
| 601 | $BaSiO_3$ | 2273 | 0.73 | $1.6 \times 10^{13}$ | ○ | 3.05 |
| 602 | $(Ba_{0.8}Ca_{0.2})SiO_3$ | 2233 | 0.57 | $1.9 \times 10^{13}$ | ○ | 3.58 |
| 603 | $(Ba_{0.6}Ca_{0.4})SiO_3$ | 2213 | 0.52 | $2.04 \times 10^{13}$ | ○ | 7.44 |
| 604 | $(Ba_{0.4}Ca_{0.6})SiO_3$ | 2218 | 0.53 | $1.36 \times 10^{13}$ | ○ | 6.27 |
| 605 | $(Ba_{0.2}Ca_{0.8})SiO_3$ | 2223 | 0.54 | $1.68 \times 10^{13}$ | ○ | 3.89 |
| 606 | $CaSiO_3$ | 2301 | 0.53 | $1.9 \times 10^{13}$ | ○ | 8.72 |

From Table 6, it could be confirmed that the effects of the present invention are Realized regardless of the ratio between Ba and Ca in the second subcomponent.

EXAMPLE 4

Change in Capacity Under Direct Current Electric Field Along with Time

The same procedure was followed as with Composition No. 301 of Example 1 to prepare samples of the present example except for adding 4.26 moles of Er, Tm, and Lu as the fourth subcomponent. Further, the same procedure was followed as with Composition No. 301 of Example 1 to prepare samples of comparative examples except for adding 2 moles or 4.26 moles of Y or Ho, which are outside of the scope of the present invention, as the fourth subcomponent.

These samples were heat treated at 150° C. for 1 hour, were allowed to stand in a no-load state at room temperature (25° C.) for 24 hours, then were measured for the initial capacity $C_0$ by an LCR meter at a measurement voltage of 1 kHz and 1.0 Vrms. Next, a direct current electric field of 6.3V per layer of the dielectric layers was applied at 40° C. for 100 hours, then the samples were allowed to stand at a no-load state at room temperature (25° C). After 24 hours and after 111 hours from when the samples began to be allowed to stand, the capacities were measured under the same conditions as with measurement of $C_0$. The amount of change $\Delta C_1$, from the initial capacity $C_0$ was found and the rate of change of capacity $\Delta C_1/C_0$ was calculated. The results are shown in Table 7.

TABLE 7

| 4th subcomp. | Change in capacity with time ($\Delta C_1/C_0$) | | | |
|---|---|---|---|---|
| | 2 mol added | | 4.26 mol added | |
| Element | 24 hr | 111 hr | 24 hr | 111 hr |
| Y (Comp. E) | −0.01222 | −0.01404 | −0.03024 | −0.02065 |
| Ho (Comp. E) | −0.01865 | −0.01564 | −0.03052 | −0.02322 |
| Er | −0.0172 | −0.01631 | −0.02694 | −0.02328 |
| Tm | −0.01916 | −0.02095 | −0.01945 | −0.02306 |
| Yb | −0.01393 | −0.01729 | −0.01081 | −0.01505 |
| Lu | −0.01054 | −0.01385 | −0.02065 | −0.02293 |

As shown in Table 7, compared with samples according to the comparative examples containing Y or Ho and satisfying the X7R characteristic, it was confirmed that the samples of the present example have changes in the capacity under a direct current electric field along with time equal to or smaller than the samples of the comparative examples and have sufficiently high reliabilities.

EXAMPLE 5

Measurement by DSC

The same procedure was followed as with Composition No. 301 of Example 1 to prepare disk-shaped samples of the present example except for adding 4.23 moles of Er, Tm, Yb, and Lu as the fourth subcomponent. Further, the same procedure was followed as with Composition No. 301 of Example 1 to prepare disk-shaped samples of comparative examples except for not adding anything as the fourth subcomponent and adding 4.23 moles of Y, Ho, Dy, Tb, La, Ce, Sm, Nd, Pr, Eu, and Gd which are outside of the scope of the present invention.

Figure 5:
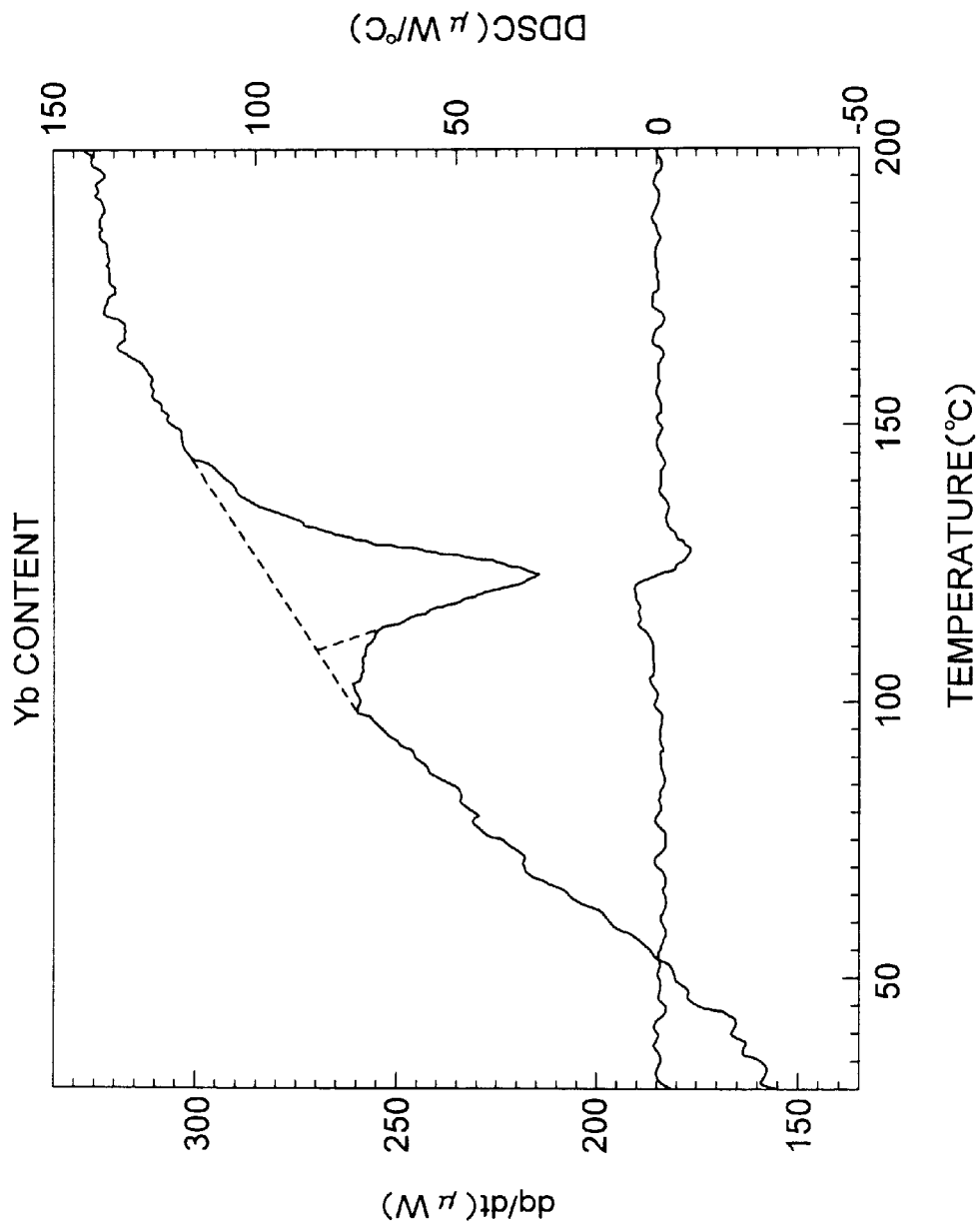
FIG. 5 is a graph of the temperature-heat difference (dq/dt) curve and temperature-DDSC curve of a dielectric ceramic composition containing Yb.
Figure 6:
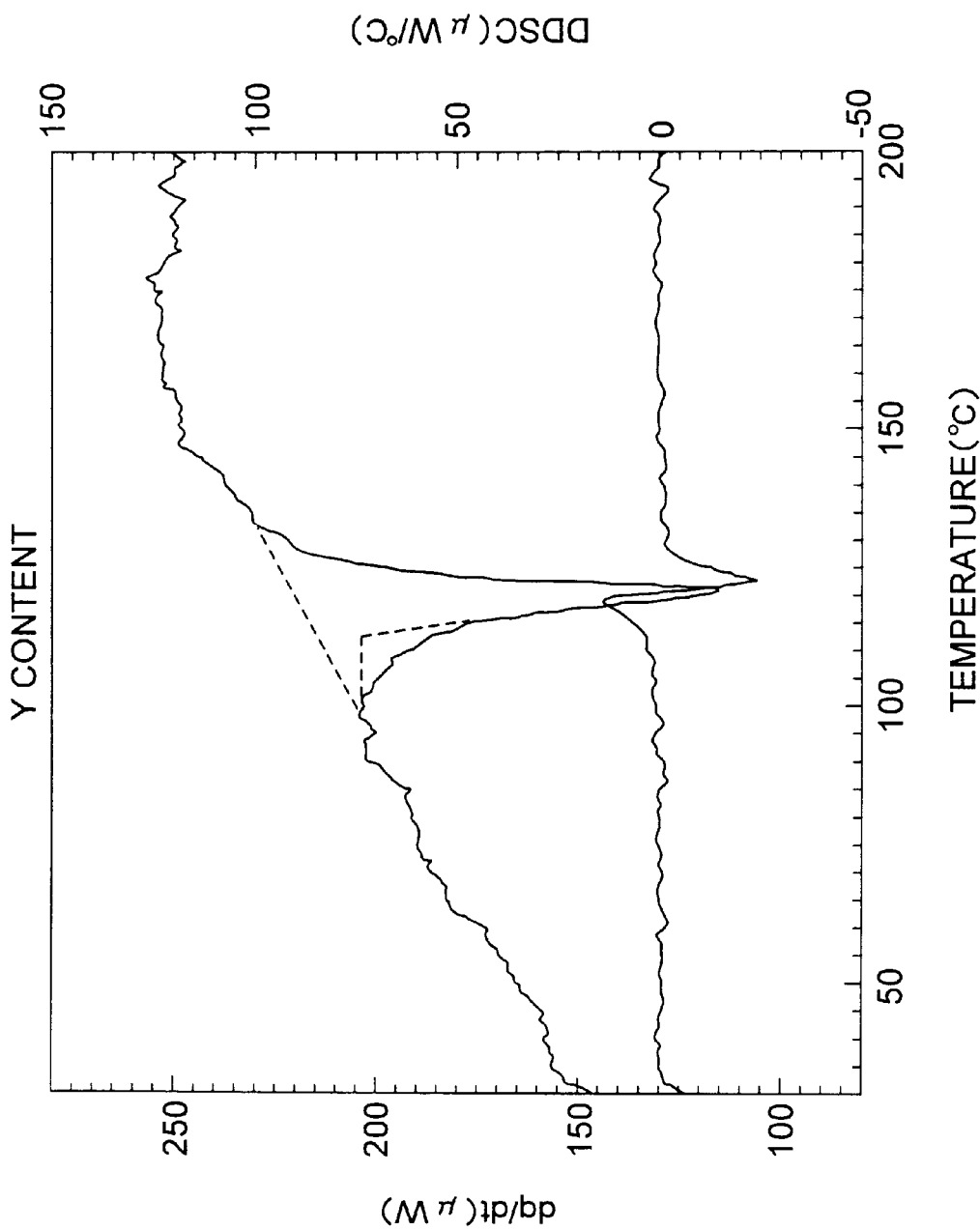
FIG. 6 is a graph of the temperature-heat difference (dq/dt) curve and temperature-DDSC curve of a dielectric ceramic composition containing Y.
Figure 7:
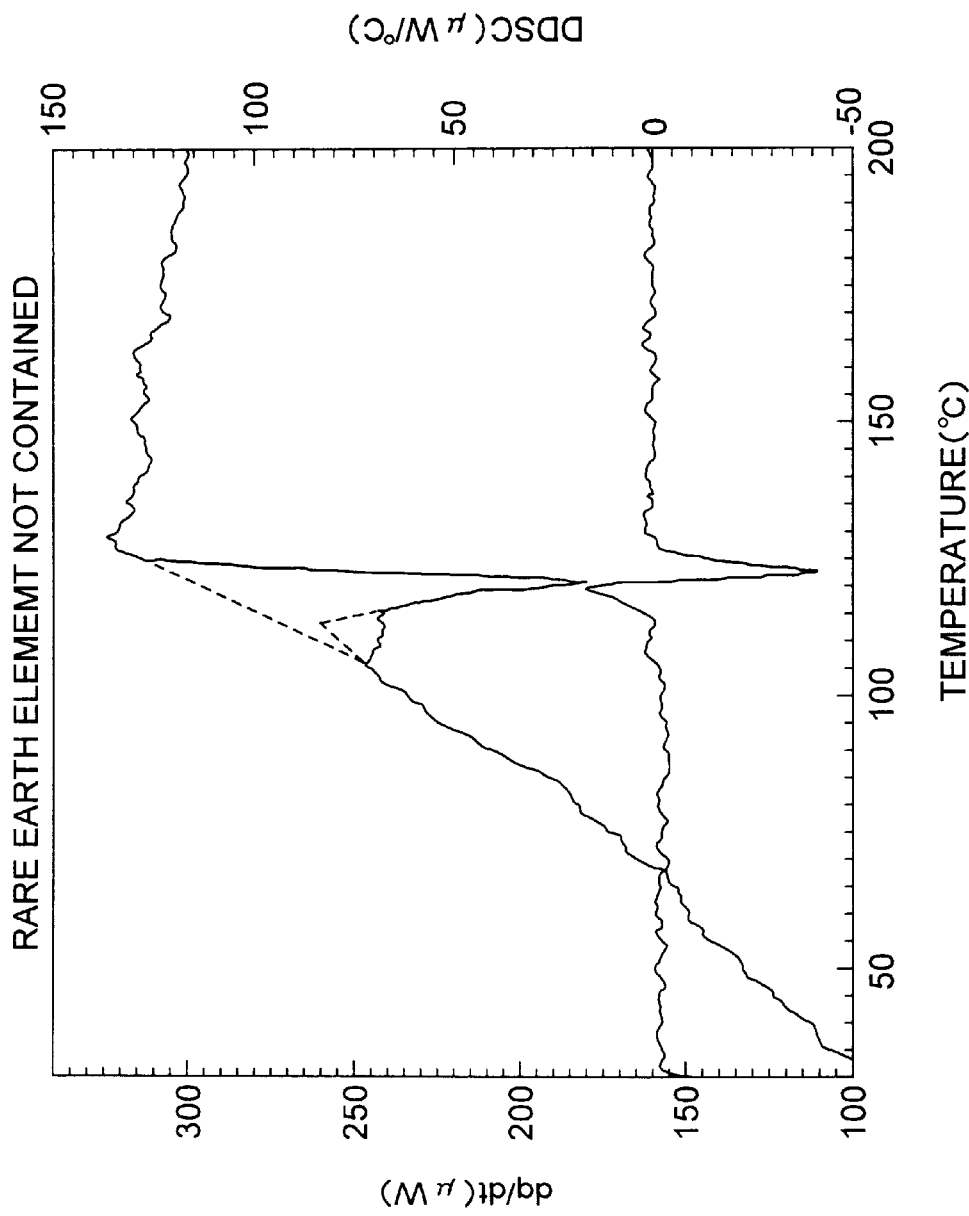
FIG. 7 is a graph of the temperature-heat difference (dq/dt) curve and temperature-DDSC curve of a dielectric ceramic composition not containing a rare earth element.

The disk-shaped samples were measured for the endothermic peak by DSC to find the Curie temperature. Further, the temperature difference between the pair of peaks in the temperature-DDSC graph was found. The results are shown in Table 8. Further, the temperature-heat flow difference (dq/dt) curve and the temperature-DDSC curve of samples containing Yb, samples containing Y, and samples not containing a rare earth element among the samples of Table 8 are shown in FIG. 5, FIG. 6, and FIG. 7.

TABLE 8

| 4th subcomp. element (4.23 mol added) | Curie temp. (° C.) | DDSC half width (° C.) |
|---|---|---|
| —(Comp. E) | 121 | 3.2 |
| Y (Comp.E) | 119 | 4 |
| Lu | 123 | 9.8 |
| Yb | 123 | 7.3 |
| Tm | 123 | 4.9 |
| Er | 122 | 4.1 |
| Ho (Comp.E) | 121 | 3.9 |
| Dy (Comp.E) | 119 | 3.6 |
| Tb (Comp.E) | Not meas. | Not meas. |
| La (Comp.E) | Not meas. | Not meas. |
| Ce (Comp.E) | Not meas. | Not meas. |
| Sm (Comp.E) | Not meas. | Not meas. |
| Nd (Comp.E) | 118 | Not meas. |
| Pr (Comp.E) | Not meas. | Not meas. |
| Eu (Comp.E) | 61 | Not meas. |
| Gd (Comp.E) | Not meas. | Not meas. |

From the results of Table 8, it is learned that samples of the examples containing the fourth subcomponent and satisfying the X8R characteristic have a temperature difference between the pair of peaks in a temperature-DDSC graph of at least 4.1° C. Note that the "Not meas." in Table 8 means that determination was not possible due to the peak strength being weak or no peak existing within the measuring range.

EXAMPLE 6

Samples having the compositions shown in the following Table 9 were prepared in the same way as in Example 1. These samples were ones using a Yb oxide as the fourth subcomponent and a Y oxide as the fifth subcomponent. These samples were measured, in the same way as in Example 1, for the relative dielectric constant ($\epsilon_r$), dielectric loss (tan$\delta$), insulation resistance (IR25), and IR lifetime. The results are shown in Table 9.

TABLE 9

| Comp. No. | 1st MgO | 2nd (Ba,Ca)SiO$_2$ | 6th MnO | 3rd V$_2$O$_5$ | 4th Yb$_2$O$_3$ | 5th Y$_2$O$_3$ | Sinter temp. (° C.) | $\epsilon$ r | tan $\delta$ [%] | R25 ($\Omega$ cm) | IR life (hr) |
|---|---|---|---|---|---|---|---|---|---|---|---|
| 901 | 2.06 | 3.0 | 0.375 | 0.01 | 2.00 | 0.0 | 1280 | 2455 | 0.49 | 1.55 × 10$^{13}$ | 10.0 |
| 902 | 2.06 | 3.0 | 0.375 | 0.01 | 2.00 | 0.2 | 1280 | 2218 | 0.49 | 1.18 × 10$^{13}$ | 10.7 |
| 903 | 2.06 | 3.0 | 0.375 | 0.01 | 2.00 | 0.6 | 1280 | 2133 | 0.43 | 1.71 × 10$^{13}$ | 19.2 |
| 904 | 2.06 | 3.0 | 0.375 | 0.01 | 2.00 | 1.2 | 1280 | 2141 | 0.47 | 1.84 × 10$^{13}$ | 72.1 |
| 905 | 2.06 | 3.0 | 0.375 | 0.01 | 2.00 | 2.0 | 1280 | 2207 | 0.55 | 2.00 × 10$^{13}$ | 102.8 |
| 906 | 2.06 | 3.0 | 0.375 | 0.01 | 3.00 | 0.0 | 1280 | 2149 | 0.46 | 2.16 × 10$^{13}$ | 9.4 |
| 907 | 2.06 | 3.0 | 0.375 | 0.01 | 3.00 | 0.2 | 1280 | 2132 | 0.47 | 1.94 × 10$^{13}$ | 9.8 |
| 908 | 2.06 | 3.0 | 0.375 | 0.01 | 3.00 | 0.6 | 1280 | 2085 | 0.51 | 1.89 × 10$^{13}$ | 11.7 |
| 909 | 2.06 | 3.0 | 0.375 | 0.01 | 3.00 | 1.2 | 1280 | 2282 | 0.49 | 1.61 × 10$^{13}$ | 47.0 |
| 910 | 2.06 | 3.0 | 0.375 | 0.01 | 3.00 | 2.0 | 1280 | 2313 | 0.56 | 2.00 × 10$^{13}$ | 40.9 |
| 911 | 2.06 | 3.0 | 0.375 | 0.01 | 4.00 | 0.0 | 1280 | 2213 | 0.52 | 2.04 × 10$^{13}$ | 7.4 |
| 912 | 2.06 | 3.0 | 0.375 | 0.01 | 4.00 | 0.2 | 1280 | 2242 | 0.51 | 1.67 × 10$^{13}$ | 7.5 |
| 913 | 2.06 | 3.0 | 0.375 | 0.01 | 4.00 | 0.6 | 1280 | 2218 | 0.52 | 1.52 × 10$^{13}$ | 11.6 |
| 914 | 2.06 | 3.0 | 0.375 | 0.01 | 4.00 | 1.2 | 1280 | 2402 | 0.55 | 5.72 × 10$^{12}$ | 14.1 |
| 915 | 2.06 | 3.0 | 0.375 | 0.01 | 4.00 | 2.0 | 1280 | 2483 | 0.71 | 4.19 × 10$^{12}$ | 15.4 |
| 916 | 2.06 | 3.0 | 0.375 | 0.01 | 4.00 | 3.0 | 1320 | 2358 | 0.70 | 8.48 × 10$^{12}$ | 31.4 |
| 917 | 2.06 | 3.0 | 0.375 | 0.01 | 4.00 | 4.0 | 1320 | 2230 | 0.73 | 8.06 × 10$^{12}$ | 40.4 |
| 918 | 2.06 | 3.0 | 0.375 | 0.01 | 4.00 | 5.0 | 1320 | 2125 | 0.75 | 8.93 × 10$^{12}$ | 42.3 |
| 919 | 2.06 | 3.0 | 0.375 | 0.01 | 5.00 | 0.2 | 1280 | 2256 | 0.56 | 5.51 × 10$^{12}$ | 14.6 |
| 920 | 2.06 | 3.0 | 0.375 | 0.01 | 5.00 | 0.6 | 1280 | 2293 | 0.61 | 2.85 × 10$^{12}$ | 13.4 |
| 921 | 2.06 | 3.0 | 0.375 | 0.01 | 5.00 | 1.2 | 1280 | 2253 | 0.54 | 4.03 × 10$^{12}$ | 13.8 |
| 922 | 2.06 | 3.0 | 0.375 | 0.01 | 5.00 | 2.0 | 1280 | 2136 | 0.88 | 1.56 × 10$^{12}$ | 9.8 |
| 923 | 2.06 | 3.0 | 0.375 | 0.01 | 5.00 | 3.0 | 1320 | 2192 | 0.72 | 9.34 × 10$^{12}$ | 20.4 |
| 924 | 2.06 | 3.0 | 0.375 | 0.01 | 5.00 | 4.0 | 1320 | 2007 | 0.69 | 9.14 × 10$^{12}$ | 14.1 |
| 925 | 2.06 | 3.0 | 0.375 | 0.01 | 5.00 | 5.0 | 1320 | 1744 | 0.65 | 8.53 × 10$^{12}$ | 7.2 |

From Table 9, it was confirmed that the IR lifetime is improved by adding a Y oxide (fifth subcomponent) in addition to a Yb oxide (fourth subcomponent). Further, it was also confirmed that no adverse effect can be observed on the other characteristics due to the addition of a Y oxide.

If the total content of the fourth subcomponent and the fifth subcomponent is too large, however, an adverse effect is caused on the sinterability, so the total content of the fourth subcomponent and the fifth subcomponent is not more than 13 moles, more preferably not more than 10 moles, with respect to 100 moles of the main component of BaTiO$_3$.

As explained above, according to the present invention, it is possible to realize a dielectric ceramic composition having a high relative dielectric constant, having a capacity-temperature characteristic satisfying the X8R characteristic of the EIA standard (−55 to 150° C., $\Delta$C =±15% or less), enabling sintering in a reducing atmosphere, having a small change in the capacity under a direct current electric field along with time, and further having a long lifetime of the insulation resistance. A multi-layer ceramic capacitor or other electronic device having a dielectric layer comprised of this dielectric ceramic composition can operate stably in various types of equipment used under hard environments such as electronic apparatuses of vehicles, therefore remarkably improve the reliability of the equipment to which they are applied.

What is claimed is:

1. A dielectric ceramic composition comprising at least:
   a main component of BaTiO$_3$,
   a first subcomponent including at least one compound selected from MgO, CaO, BaO, SrO and Cr$_2$O$_3$,
   a second subcomponent of (Ba, Ca)$_x$SiO$_{2+x}$, (where, x =0.8 to 1.2),
   a third subcomponent including at least one compound selected from V$_2$O$_5$, MoO$_3$, and WO$_3$, and
   a fourth subcomponent including an oxide of R1 (where R1 is at least one element selected from Sc, Er, Tm, Yb, and Lu), wherein
   the ratios of the subcomponents to 100 moles of the main component of BaTiO$_3$ are:
   the first subcomponent: 0.1 to 3 moles,
   the second subcomponent: 2 to 10 moles,
   the third subcomponent: 0.01 to 0.5 mole, and
   the fourth subcomponent: 0.5 to 7 moles (where the number of moles of the fourth subcomponent is the ratio of R1 alone).

2. The dielectric ceramic composition as set forth in claim 1, further comprising as a fifth subcomponent an oxide of R2 (where R2 is at least one element selected from Y, Dy, Ho, Tb, Gd and Eu), the content of the fifth subcomponent being not more than 9 moles with respect to 100 moles of the main component of BaTiO$_3$ (where the number of moles of the fifth subcomponent is the ratio of R2 alone).

3. The dielectric ceramic composition as set forth in claim 2, wherein the total content of the fourth subcomponent and the fifth subcomponent is not more than 13 moles with respect to 100 moles of the main component of BaTiO$_3$ (where the numbers of moles of the fourth subcomponent and fifth subcomponent are the ratios of R1 and R2 alone).

4. The dielectric ceramic composition as set forth in claim 1 further comprising as a sixth subcomponent MnO, the content of the sixth subcomponent being not more than 0.5 mole with respect to 100 moles of the main component of BaTiO$_3$.

5. A dielectric ceramic composition containing BaTiO$_3$ as a main component, wherein X-ray diffraction using Cu-Kα-rays reveals a pseudo cubic peak including a (002) peak and (200) peak in the range of 2θ=44 to 46°, the half-width of the pseudo cubic peak is at least 0.3°, and, when the intensity of the (002) peak is I(002) and the intensity of the (200) peak is I(200), I(002) ≧I(200).

6. A dielectric ceramic composition containing $BaTiO_3$ as a main component, wherein when the value of the heat flow difference per unit time (dq/dt) measured by DSC (differential scan calorimetry) differentiated by temperature is DDSC (Differential Calorimetry Differentiated by Temperature), a temperature difference between a pair of peaks present at the two sides of the Curie temperature in a graph of the relationship between temperature and the DDSC is at least 4.1 ° C.

7. An electronic device having a dielectric layer, wherein the dielectric layer comprises at least:

a main component of $BaTiO_3$, a first subcomponent including at least one compound selected from MgO, CaO, BaO, SrO and $Cr_2O_3$, a second subcomponent of $(Ba, Ca)_x SiO_{2+x}$ (where, x =0.8 to 1.2), a third subcomponent including at least one compound selected from $V_2O_5$, $MoO_3$, and $WO_3$, and a fourth subcomponent including an oxide of R1 (where R1 is at least one element selected from Sc, Er, Tm, Yb, and Lu), wherein the ratios of the subcomponents to 100 moles of the main component of $BaTiO_3$ are:

the first subcomponent: 0.1 to 3 moles,.

the second subcomponent: 2 to 10 moles, the third subcomponent: 0.01 to 0.5 mole, and the fourth subcomponent: 0.5 to 7 moles (where the number of moles of the fourth subcomponent is the ratio of R1 alone).

8. The electronic device as set forth in claim 7, wherein the dielectric layer further comprises as a fifth subcomponent an oxide of R2 (where R2 is at least one element selected from Y, Dy, Ho, Tb, Gd and Eu), the content of the fifth subcomponent being not more than 9 moles with respect to 100 moles of the main component of $BaTiO_3$ (where the number of moles of the fifth subcomponent is the ratio of R2 alone).

9. The electronic device as set forth in claim 8, wherein the total content of the fourth subcomponent and the fifth subcomponent is not more than 13 moles with respect to 100 moles of the main component of $BaTiO_3$ (where the numbers of moles of the fourth subcomponent and fifth subcomponent are the ratios of R1 and R2 alone).

10. The electronic device as set forth in claim 7 wherein the dielectric layer further comprises as a sixth subcomponent MnO, the content of the sixth subcomponent being not more than 0.5 mole with respect to 100 moles of the main component of $BaTiO_3$.

11. The electronic device as set forth in claim 7, having a capacitor device body comprised of dielectric layers and internal electrode layers alternately.

12. The electronic device of claim 11, wherein the electroconductive material included in the internal electrode layers is Ni or an Ni alloy.

13. An electronic device having a dielectric layer, the dielectric layer comprising a dielectric ceramic composition containing $BaTiO_3$ as a main component, wherein analysis of the dielectric layer by X-ray diffraction using Cu-Kα-rays reveals a pseudo cubic peak including a (002) peak and (200) peak in the range of 2θ=44° to 46°, the half-width of the pseudo cubic peak is at least 0.3°, and, when the intensity of the (002) peak is I(002) and the intensity of the (200) peak is I(200), I(002)≧I(200).

14. An electronic component having a dielectric layer, the dielectric layer comprising a dielectric ceramic composition containing $BaTiO_3$ as a main component and when the value of the heat flow difference per unit time (dq/dt) measured by DSC (differential scan calorimetry) differentiated by temperature (Differential Scan Calorimetry Differentiated by Temperature), a temperature difference between a pair of peaks present at the two sides of the Curie temperature in a graph of the relationship between temperature and the DDSC is at least 4.1° C.

* * * * *